(12) United States Patent
Sumita et al.

(10) Patent No.: US 8,648,165 B2
(45) Date of Patent: Feb. 11, 2014

(54) POLYCARBONATE RESIN COMPOSITION

(75) Inventors: Atsushi Sumita, Chiyoda-ku (JP);
Daisuke Takahashi, Chiyoda-ku (JP);
Fumihiro Togashi, Chiyoda-ku (JP);
Tomoyuki Hirano, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 13/522,138

(22) PCT Filed: Jan. 13, 2011

(86) PCT No.: PCT/JP2011/050901
§ 371 (c)(1),
(2), (4) Date: Jul. 13, 2012

(87) PCT Pub. No.: WO2011/087141
PCT Pub. Date: Jul. 21, 2011

(65) Prior Publication Data
US 2012/0289655 A1 Nov. 15, 2012

(30) Foreign Application Priority Data

Jan. 15, 2010 (JP) ................................. 2010-006883
Aug. 10, 2010 (JP) ................................. 2010-179394

(51) Int. Cl.
*C08G 63/02* (2006.01)
*C08G 64/00* (2006.01)

(52) U.S. Cl.
USPC ............. 528/272; 525/439; 528/17; 528/200; 528/279; 528/287; 528/308.6

(58) Field of Classification Search
USPC ................ 528/17, 200, 272, 279, 287, 308.6; 525/439
See application file for complete search history.

(56) References Cited

U.S. PATENT DOCUMENTS

| | | | |
|---|---|---|---|
| 4,753,994 A | 6/1988 | Carter, Jr. et al. | |
| 4,767,821 A | 8/1988 | Lindner et al. | |
| 5,308,894 A * | 5/1994 | Laughner ..................... | 523/436 |
| 5,684,088 A | 11/1997 | Miyamori et al. | |
| 5,804,654 A | 9/1998 | Lo et al. | |
| 6,005,025 A | 12/1999 | Bhatia et al. | |
| 6,025,441 A | 2/2000 | Koshirai et al. | |
| 6,346,630 B1 | 2/2002 | Nesvadba et al. | |
| 2003/0187151 A1 | 10/2003 | Adams et al. | |
| 2004/0176564 A1* | 9/2004 | Yamamoto et al. ........... | 528/286 |

FOREIGN PATENT DOCUMENTS

| | | |
|---|---|---|
| EP | 0 483 510 | 5/1992 |
| JP | 36-14035 | 10/1959 |
| JP | 39-20434 | 8/1962 |
| JP | 51-102043 | 9/1976 |
| JP | 59-176345 | 10/1984 |
| JP | 60-258263 | 12/1985 |
| JP | 63-154744 | 6/1988 |
| JP | 04-272957 | 9/1992 |
| JP | 05-306336 | 11/1993 |
| JP | 06-145520 | 5/1994 |
| JP | 06-172508 | 6/1994 |
| JP | 06-220210 | 8/1994 |
| JP | 07-233160 | 9/1995 |
| JP | 08-027370 | 1/1996 |
| JP | 08-188653 | 7/1996 |
| JP | 09-095583 | 4/1997 |
| JP | 11-029679 | 2/1999 |
| JP | 2001-055435 | 2/2001 |
| JP | 2002-117580 | 4/2002 |
| JP | 2003-160656 | 6/2003 |
| JP | 2003-213144 | 7/2003 |
| JP | 2004-218160 | 8/2004 |
| JP | 2005-521772 | 7/2005 |
| JP | 2007-176969 | 7/2007 |
| JP | 2007-176971 | 7/2007 |
| JP | 2008-45083 | 2/2008 |
| JP | 2009-001619 | 1/2009 |
| WO | 03/008479 | 1/2003 |
| WO | 2006/004005 | 1/2006 |

OTHER PUBLICATIONS

International Search Report issued Feb. 15, 2011 in International (PCT) Application No. PCT/JP2011/050901.
International Preliminary Report on Patentability and Written Opinion of the International Searching Authority issued Aug. 16, 2012 in International (PCT) Application No. PCT/JP2011/050901.
Chinese Office Action dated Jul. 10, 2013 in a corresponding Chinese patent application.

* cited by examiner

*Primary Examiner* — Terressa Boykin
(74) *Attorney, Agent, or Firm* — Wenderoth, Lind & Ponack, L.L.P.

(57) ABSTRACT

The present invention seeks to provide a resin composition which contains an aromatic polycarbonate resin and a polyester resin and which has excellent mechanical strength, flowability and thermal stability and also has excellent moist heat resistance together.

The present invention is a resin composition containing 50 to 99 parts by weight of an aromatic polycarbonate resin (component A) and 1 to 50 parts by weight of a polyester resin (component B), the component B being a polyester resin polymerized in the presence of a titanium-phosphorus catalyst obtained by reacting titanium tetrabutoxide, etc., with monolauryl phosphate, etc.

9 Claims, No Drawings

POLYCARBONATE RESIN COMPOSITION

TECHNICAL FIELD

This invention relates to a resin composition which contains an aromatic polycarbonate resin and a polyester resin and which is excellent in thermal stability and moist heat resistance. More specifically, it relates to a resin composition which contains an aromatic polycarbonate resin and a polyester resin obtained by polymerization in the presence of a titanium-phosphorus catalyst and is excellent in mechanical strength and flowability and which further has both excellent thermal stability and moist heat resistance.

BACKGROUND ART

A resin composition containing an aromatic polycarbonate resin and a polyester resin has a high level of an appearance, excellent mechanical properties, dimensional stability and chemical resistance and is hence widely used in various industrial fields. In particular, with regard to a resin composition containing an aromatic polycarbonate resin and a polyethylene terephthalate resin (to be sometimes referred to as "PC/PET alloy" hereinafter), various resin compositions are under study (see Patent Documents 1, 2 and 3). Since the PC/PET alloy has properties achieved by combining the excellent impact resistance, mechanical properties and dimensional stability of an aromatic polycarbonate resin with the chemical resistance of a polyethylene terephthalate resin, it is effectively used in particular in the fields of interior and exterior automotive trims and OA equipment and machines.

In recent years, in the fields of automotive trims and OA equipment and machines, a rapid decrease in part thickness and a rapid decrease in part weight are in progress. For example, the technical development of resin materials that are to be used for producing large parts typified by body panels such as a fender is again actively made for a decrease in weight in the automotive field, and these parts requiring a decrease in thickness and weight are increasingly required to have heat resistance and moist heat resistance more than ever. Further, it is required to decrease the number of parts for reducing costs, and such resin materials are now required to have moldability for meeting with the integration of parts and the consequent complicated and large forms, i.e., excellent thermal stability.

Under the circumstances, an alloy material using PET produced in the presence of a specific polymerization catalyst is proposed as means by which PC/PET alloy satisfies the above requirements (see Patent Documents 4 and 5). Patent Document 4 proposes the use of a germanium catalyst in order to overcome that degradation of the color tone, melt stability, appearance and moldability which is found in PET produced in the presence of an antimony compound or titanium compound which is generally used as a polymerization catalyst. However, its outcome is not satisfactory with regard to the moist heat resistance and thermal stability that are required in the field of automotive use, and further improvements are required.

Patent Document 5 proposes that a polyester resin produced in the presence of 1 to 30 ppm of a titanium-containing catalyst compound be incorporated in order to improve the color tone, thermal stability and melt stability. Since the catalyst amount is reduced, the thermal stability and melt stability are improved. However, with an increase in the amount of the polyester resin, the thermal stability tends to be decreased, and further improvements are required. Further, Patent Document 5 teaches nothing concerning the finding of the moist heat resistance of a resin composition comprising an aromatic polycarbonate resin and a polyester resin which is increasingly required to attain.

Patent Document 6 describes that a polyester resin having an excellent color tone (b value), a decreased amount of foreign matter and excellent thermal stability during melting can be produced by using a titanium-containing catalyst having a specific structure. However, it does not refer to any effect on a resin composition containing a different resin other than a polyester resin, nor does it teach anything concerning the finding of the moist heat resistance of a resin composition comprising an aromatic polycarbonate resin and a polyester resin which is increasingly required to attain.

As described above, in the PC/PET alloy, there is desired a material which maintains good thermal stability and at the same time has high moist heat resistance and which is excellent in chemical resistance, impact strength, heat resistance and rigidity.

(Patent Document 1) JP36-14035B
(Patent Document 2) JP39-20434B
(Patent Document 3) JP59-176345A
(Patent Document 4) JP51-102043A
(Patent Document 5) JP2005-521772A
(Patent Document 6) Japanese Patent No. 3897756 (WO2003/008479)

DISCLOSURE OF THE INVENTION

It is an object of this invention to provide a resin composition which contains an aromatic polycarbonate resin (component A) and a polyester resin (component B), which is excellent in mechanical strength, flowability and thermal stability and has good moist heat resistance as well. For achieving the above object, the present inventors have made diligent studies and as a result have found that the above object can be achieved by using a polyester resin produced in the presence of a specific titanium-phosphorus catalyst.

According to this invention, the above object can be achieved by the following inventions.

1. A resin composition containing 50 to 99 parts by weight of an aromatic polycarbonate resin (component A) and 1 to 50 parts by weight of a polyester resin (component B), the component B being a polyester resin polymerized in the presence of a titanium-phosphorus catalyst obtained by a reaction between a titanium compound (I) represented by the following formula (I) or a titanium compound obtained by reacting said titanium compound (I) with an aromatic polyhydric carboxylic acid represented by the following formula (II) or an anhydride thereof and a phosphorus compound represented by the following formula (III),

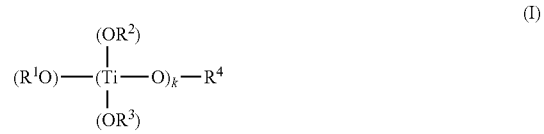

wherein each of $R^1$, $R^2$, $R^3$ and $R^4$ is independently an alkyl group having 2 to 10 carbon atoms, k is an integer of 1 to 3, and when k is 2 or 3, each of two or three $R^2$s and $R^3$s may be the same as, or different from, each other or every other,

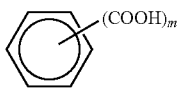

(II)

wherein m is an integer of 2 to 4,

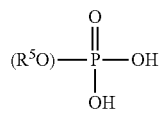

(III)

wherein $R^5$ is a substituted or non-substituted aryl group having 6 to 20 carbon atoms or an alkyl group having 1 to 20 carbon atoms.

2. A resin composition recited in the above 1, which contains 0.001 to 50 ppm of a titanium element.

3. A resin composition recited in the above 1, wherein the titanium-phosphorus catalyst is represented by the following formula (IV),

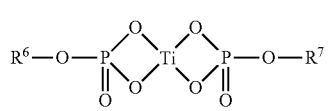

(IV)

wherein each of $R^6$ and $R^7$ is independently an alkyl group having 2 to 12 carbon atoms or an aryl group having 6 to 12 carbon atoms.

4. A resin composition recited in the above 1, wherein the component B is polyethylene terephthalate.

5. A resin composition as recited in the above 1, which contains 1 to 50 parts by weight of a rubbery polymer (component C) per 100 parts by weight of total of the components A and B.

6. A resin composition as recited in the above 5, wherein the component C is a rubbery polymer obtained by copolymerizing an acrylic monomer or a mixture of an acrylic monomer with a monomer copolymerizable with the acrylic monomer in the presence of at least one rubber component selected from the group consisting of a diene-based rubber, an acrylic rubber and a silicone-based rubber.

7. An injection-molded article formed from the resin composition recited in the above 1.

8. An injection-molded article as recited in the above 7, which is an interior or exterior automotive trim.

9. An injection-molded article as recited in the above 7, which is a housing material for an OA machine or electric or electronic machine.

BEST MODE FOR CARRYING OUT THE INVENTION

This invention will be further explained in detail hereinafter.
(Component A: Aromatic Polycarbonate Resin)

The aromatic polycarbonate resin (component A) is obtained by reacting dihydric phenol and a carbonate precursor. Examples of the reaction method include an interfacial polymerization method, a melt ester-exchange method, a method of solid phase ester-exchange of a carbonate prepolymer and a method of ring-opening of a cyclic carbonate compound.

Typical examples of the above dihydric phenol include hydroquinone, resorcinol, 4,4'-biphenol, 1,1-bis(4-hydroxyphenyl)ethane, 2,2-bis(4-hydroxyphenyl)propane (so-called bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. The dihydric phenol is preferably bis(4-hydroxyphenyl)alkane, and bisphenol A is in particular preferably and generally used in respect of impact resistance.

In this invention, besides bisphenol A type polycarbonates which are general-purpose polycarbonates, special polycarbonates produced from other dihydric phenols can be used as a component A.

For example, polycarbonates (homopolymers or copolymers) obtained by using, as a part or the whole of the dihydric phenol component, 4,4'-(m-phenylenediisopropylidene)diphenol (to be sometimes abbreviated as "BPM" hereinafter), 1,1-bis(4-hydroxyphenyl)cyclohexane, 1,1-bis(4-hydroxyphenyl)-3,3,5-trimethylcyclohexane (to be sometimes referred to as "Bis-TMC" hereinafter), 9,9-bis(4-hydroxyphenyl)fluorene and 9,9-bis(4-hydroxy-3-methylphenyl)fluorene (to be sometimes referred to as "BCF" hereinafter) are suitable for use in fields having severe requirements against a dimensional change and form stability against water absorption. The amount of these dihydric phenols other than BPA based on the total of dihydric phenols for constituting the subject polycarbonate is preferably 5 mol % or more, particularly preferably 10 mol % or more.

When especially high rigidity and excellent hydrolysis resistance are required, the aromatic polycarbonate resin (component A) is particularly suitably any one of the following copolycarbonates (1) to (3).

(1) A copolycarbonate from dihydric phenol components in which, per 100 mol % of the dihydric phenol components, the amount of BPM is 20 to 80 mol %, (more suitably 40 to 75 mol %, still more suitably 45 to 65 mol %), and the amount of BCF is 20 to 80 mol %, (more suitably 25 to 60 mol %, still more suitably 35 to 55 mol %).

(2) A copolycarbonate from dihydric phenol components in which, per 100 mol % of the dihydric phenol components, the amount of BPA is 10 to 95 mol %, (more suitably 50 to 90 mol %, still more suitably 60 to 85 mol %), and the amount of BCF is 5 to 90 mol %, (more suitably 10 to 50 mol %, still more suitably 15 to 40 mol %).

(3) A copolycarbonate from dihydric phenol components in which, per 100 mol % of the dihydric phenol components, the amount of BPM is 20 to 80 mol %, (more suitably 40 to 75 mol %, still more suitably 45 to 65 mol %), and the amount of Bis-TMC is 20 to 80 mol %, (more suitably 25 to 60 mol %, still more suitably 35 to 55 mol %).

These special polycarbonates may be used singly or as a mixture of the two or more of them. Further, any one of these may be used as a mixture thereof with a general-purpose bisphenol A type polycarbonate.

These special polycarbonates are described in detail, for example, in JP6-172508A, JP8-27370A, JP2001-55435A and JP2002-117580A with regard to their production processes and properties.

Of the above various polycarbonates, polycarbonates of which the water absorptivity and Tg (glass transition temperature) are brought into the following ranges by adjusting copolymerization component amount ratios, etc., have excellent hydrolysis resistance of polymers themselves and also the low warping properties of their molded products are remarkably excellent, so that they are in particular suitable for use in fields where form stability is required.

(i) A polycarbonate having a water absorptivity of 0.05 to 0.15%, preferably 0.06 to 0.13% and a Tg of 120 to 180° C., or (ii) a polycarbonate having a Tg of 160 to 250° C., preferably 170 to 230° C. and a water absorptivity of 0.10 to 0.30%, preferably 0.13 to 0.30%, more preferably 0.14 to 0.27%.

The above water absorptivity of a polycarbonate refers to a value obtained by using a disc-shaped test piece having a diameter of 45 mm and a thickness of 3.0 mm and measuring it for a water content after it is immersed in water at 23° C. for 24 hours according to ISO62-1980. Further, the Tg (glass transition temperature) refers to a value determined by differential scanning calorimeter (DSC) measurement according to JIS K7121.

The carbonate precursor is selected from carbonyl halide, carbonate diester or haloformate, and specifically, it includes phosgene, diphenyl carbonate and dihaloformate of a dihydric phenol.

When an aromatic polycarbonate resin is produced from the above dihydric phenol and carbonate precursor by an interfacial polymerization method, a catalyst, a terminal stopper and an antioxidant for preventing oxidation of the dihydric phenol may be used as required. Further, the aromatic polycarbonate resin (component A) includes a branched polycarbonate resin obtained by copolymerization with a trifunctional or higher polyfunctional aromatic compound, a polyester carbonate resin obtained by copolymerization with an aromatic or aliphatic (including alicyclic) difunctional carboxylic acid, a copolycarbonate resin obtained by copolymerization with a difunctional alcohol (including alicyclic) and a polyester carbonate resin obtained by copolymerization with both a difunctional carboxylic acid and a difunctional alcohol. Further, it may be a mixture of two or more of the thus-obtained aromatic polycarbonate resins.

The branched polycarbonate resin can impart the resin composition of this invention with dripping-preventing capability. The trifunctional or higher polyfunctional aromatic compound used for the above branched polycarbonate resin include phloroglucin, phloroglucide, trisphenols such as 4,6-dimethyl-2,4,6-tris(4-hydroxydiphenyl)heptene-2,2,4,6-trimethyl-2,4,6-tris(4-hydroxyphenyl)heptane-2,1,3,5-tris(4-hydroxyphenyl)benzene, 1,1,1-tris(4-hydroxyphenyl) ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxyphenylethyl)benzene, trimellitic acid, pyromellitic acid, benzophenonetetracarboxylic acid and acid chlorides of these. Of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The content of a constituent unit derived from the polyfunctional aromatic compound in the branched polycarbonate per 100 mol % of the total of a constituent unit derived from the dihydric phenol and this constituent unit derived from the polyfunctional aromatic compound is 0.01 to 1 mol %, preferably 0.05 to 0.9 mol %, particularly preferably 0.05 to 0.8 mol %.

Further, in the melt ester-exchange method in particular, a branched structure unit is sometimes generated as a side reaction. The content of such a branched structure unit per 100 mol % of the total with a constituent unit derived from the dihydric phenol is 0.001 to 1 mol %, preferably 0.005 to 0.9 mol %, particularly preferably 0.001 to 0.8 mol %. The amount ratio of the above branched structure can be calculated on the basis of 1H-NMR measurement.

The aliphatic difunctional carboxylic acid is preferably α,ω-dicarboxylic acid. The aliphatic difunctional carboxylic acid includes linear saturated aliphatic dicarboxylic acids such as sebacic acid (decanedioic acid), dodecanedioic acid, tetradecanedioic acid, octadecanedioic acid and eicosanoic acid and alicyclic dicarboxylic acids such as cyclohexanedicarboxylic acid. The difunctional alcohol is more preferably an alicyclic diol, and examples thereof include cyclohexanedimethanol, cyclohexanediol and tricyclodecanedimethanol.

Further, a polycarbonate-polyorganosiloxane copolymer obtained by copolymerization with a polyorganosiloxane unit can be also used.

Reaction schemes in the interfacial polymerization method, the melt ester-exchange method, the method of solid phase ester-exchange of a carbonate prepolymer and the method of ring-opening of a cyclic carbonate compound are well known in various documents and patent publications.

The viscosity average molecular weight of the aromatic polycarbonate resin (component A) is preferably 10,000 to 50,000, more preferably 14,000 to 30,000, still more preferably 14,000 to 26,000. When the aromatic polycarbonate resin has a viscosity average molecular weight of less than 10,000, no good mechanical properties can be obtained. On the other hand, a resin composition containing the aromatic polycarbonate resin having a viscosity average molecular weight of over 50,000 is poor in general versatility since it is poor in flowability during injection-molding.

The aromatic polycarbonate resin (component A) may be a mixture containing an aromatic polycarbonate resin having a viscosity average molecular weight outside the above range. Especially, an aromatic polycarbonate resin having a viscosity average molecular weight of over the above range (50,000) improves a resin composition in entropy elasticity. As a result, it exhibits excellent moldability in a gas-assisted molding and expansion molding which are sometimes used for molding a resin composition into structural members. It improves the moldability more than the above branched polycarbonate. In a more preferred embodiment, there can be also used an aromatic polycarbonate resin (component A-1) which contains, as component A, an aromatic polycarbonate resin (component A-1-1) having a viscosity average molecular weight of 70,000 to 300,000 and an aromatic polycarbonate resin (component A-1-2) having a viscosity average molecular weight of 10,000 to 30,000 and which has a viscosity average molecular weight of 16,000 to 35,000 (to be sometimes referred to as "high-molecular-weight-component-containing aromatic polycarbonate resin" hereinafter).

In the above high-molecular-weight-component-containing aromatic polycarbonate resin (component A-1), the molecular weight of the component A-1-1 is preferably 70,000 to 200,000, more preferably 80,000 to 200,000, still more preferably 100,000 to 200,000, particularly preferably 100,000 to 160,000. The molecular weight of the component A-1-2 is preferably 10,000 to 25,000, more preferably 11,000 to 24,000, still more preferably 12,000 to 24,000, particularly preferably 12,000 to 23,000.

The high-molecular-weight-component-containing aromatic polycarbonate resin (component A-1) can be obtained by mixing the above component A-1-1 and the above component A-1-2 in various amount ratios and adjusting the mixture so as to satisfy a predetermined molecular weight range. In 100% by weight of the component A-1, the content of the component A-1-1 is preferably 2 to 40% by weight, more preferably 3 to 30% by weight, still more preferably 4 to 20% by weight, particularly preferably 5 to 20% by weight.

Further, the method of preparing the component A-1 includes (1) a method in which the component A-1-1 and the component A-1-2 are independently polymerized and mixed, (2) a method in which an aromatic polycarbonate resin is produced so as to satisfy the conditions of the component A-1 in this invention by a method of producing an aromatic polycarbonate resin that exhibits a plurality of polymer peaks in a molecular weight distribution chart based on a GPC method in the same system, as is typified by JP5-306336A, and (3) a method in which an aromatic polycarbonate resin obtained by the above production method (production method in the (2)) and a separately produced component A-1-1 and/or component A-1-2 are mixed.

With regard to the viscosity average molecular weight in this invention, first, a specific viscosity ($\eta_{sp}$) to be calculated by the following expression is obtained from a solution of 0.7 g of a polycarbonate in 100 ml of methylene chloride at 20° C. with an Ostwald viscometer, $$\text{Specific viscosity}(\eta_{sp})=(t-t_0)/t_0$$

in which $t_0$ is the number of seconds that methylene chloride takes to drop and t is the number of seconds that a sample solution takes to drop, and a viscosity average molecular weight (M) is calculated from the obtained specific viscosity ($\eta_{sp}$) on the basis of the following expression.

$$\eta_{sp}/c=[\eta]+0.45\times[\eta]^2 c$$

(in which [η] is an intrinsic viscosity),
[α]=$1.23\times10^{-4}M^{0.83}$
c=0.7

In a resin composition containing a glass fiber, provided by this invention, the viscosity average molecular weight of the aromatic polycarbonate resin is calculated in the following manner. That is, the above composition is mixed with methylene chloride having a weight 20 to 30 times the weight of the composition to dissolve a soluble component contained in the composition. The soluble component is collected by cerite filtering. Then, a solvent in the resultant solution is removed. A solid obtained after the removal of the solvent is fully dried to obtain a solid that is to be dissolved in methylene chloride. A specific viscosity at 20° C. is determined from a solution of 0.7 g of the above solid in 100 ml of methylene chloride in the same manner as in the above description, and a viscosity average molecular weight (M) is calculated from the above specific viscosity in the same manner as in the above description.

(Component B: Polyester Resin)

The polyester resin (component B) is a polymer or copolymer obtained by a condensing reaction using, as main components, an aromatic dicarboxylic acid or its reactive derivative and a diol or its ester derivative.

The above aromatic dicarboxylic acid includes aromatic dicarboxylic acids such as terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenyletherdicarboxylic acid, 4,4'-biphenylmethanedicarboxylic acid, 4,4'-biphenylsulfonedicarboxylic acid, 4,4'-biphenylisopropylidenedicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid and 2,5-pyridinedicarboxylic acid. Further, it also includes diphenylmethanedicarboxylic acid, diphenyletherdicarboxylic acid and β-hydroxyethoxybenzoic acid. In particular, terephthalic acid and 2,6-naphthalenedicarboxylic acid can be preferably used. The aromatic dicarboxylic acids may be used as a mixture of the two or more of them. Aliphatic dicarboxylic acids such as adipic acid, azelaic acid, sebacic acid and dodecanedioic acid and alicyclic dicarboxylic acids such as cyclohexanedicarboxylic acid may be used as a mixture of one or more of these in combination with the above dicarboxylic acid so long as their amount is small.

The diol includes aliphatic diols such as ethylene glycol, propylene glycol, butylenes glycol, hexylene glycol, neopentyl glycol, pentamethylene glycol, hexamethylene glycol, decamethylene glycol, 2-methyl-1,3-propanediol, diethylene glycol and triethylene glycol. It also includes alicyclic diols such as 1,4-cyclohexanedimethanol. Further, it also includes diols containing an aromatic ring such as 2,2-bis(β-hydroxyethoxyphenyl)propane and a mixture of these. At least one of long-chain diols having a molecular weight of 400 to 6,000, such as polyethylene glycol, poly-1,3-propylene glycol and polytetramethylene glycol, may be copolymerized so long as their amount is small.

The polyester resin (component B) can be branched by introducing a small amount of a branching agent. The branching agent is not limited in kind, while it includes trimesic acid, trimellitic acid, trimethylolethane, trimethylolpropane and pentaerythritol.

The polyester resin (component B) includes polyethylene terephthalate (PET), polytrimethylene terephthalate, polybutylene terephthalate (PBT), polyhexylene terephthalate, polyethylene naphthalate (PEN), polybutylene naphthalate (PBN) and polyethylene-1,2-bis(phenoxy)ethane-4,4'-dicarboxylate. It also includes copolyester resins such as polyethylene isophthalate/terephthalate and polybutylene terephthalate/isophthalate. Of these, polyethylene terephthalate, polybutylene terephthalate, polyethylene naphthalate, polybutylene naphthalate and a mixture of some of these, which are well-balanced in mechanical properties, can be preferably used.

Further, the terminal group structure of the polyester resin (component B) is not specially limited, and there may be employed not only a case where the content of a hydroxy group and the content of a carboxyl group in the terminal group are nearly equivalent but also a case where one of these contents is larger than the other in the terminal group. Further, there may be employed a constitution in which the terminal group is blocked by reacting it with a compound reactive with the terminal group.

The above polyester resin (component B) is produced by polymerizing the dicarboxylic acid component and the above diol component under heat in the presence of a specific titanium-containing catalyst, and discharging by-produced water or lower alcohol out of the system, according to a conventional method.

(Titanium-Phosphorus Catalyst)

The titanium-phosphorus catalyst is a reaction product of the following titanium compound and phosphorus compound.

(Titanium Compound)

The titanium compound is a titanium compound (1) represented by the following formula (I) or a titanium compound (2) obtained by reacting the titanium compound (1) and an aromatic polyhydric carboxylic acid represented by the following formula (II) or an acid anhydride thereof.

(Titanium Compound (1))

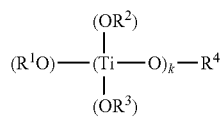

In the formula (I), each of $R^1$, $R^2$, $R^3$ and $R^4$ is independently an alkyl group having 2 to 10 carbon atoms, k is an integer of 1 to 3, and when k is 2 or 3, each of two or three $R^2$s and $R^3$s may be the same as, or different from, each other or every other. The alkyl group includes ethyl, propyl, butyl, pentyl, hexyl, octyl, decyl, etc.

The titanium compound (1) includes titanium tetraalkoxides such as titanium tetrabutoxide, titanium tetraisopropoxide, titanium tetrapropoxide and titanium tetraethoxide, and octaalkyl trititanates such as octamethyl trititanate, octaethyl trititanate, octaisopropyl trititanate, octa-n-propyl trititanate and octabutyl trititanate, and alkyl titanates such as hexamethyl dititanate, hexaethyl dititanate, hexaisopropyl dititanate, hexa-n-propyl dititanate, hexabutyl dititanate and hexaalkyl dititanates. Of these, titanium tetraalkoxides having excellent reactivity with a phosphorus compound are preferred, and titanium tetrabutoxide is more preferred.

(Titanium Compound (2))

The titanium compound (2) is a reaction product of the above titanium compound (I) and an aromatic polyhydric carboxylic acid represented by the formula (II) or its acid anhydride.

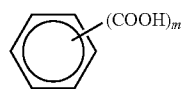

In the formula (II), m is an integer of 2 to 4. The aromatic polyhydric carboxylic acid represented by the formula (II) or its acid anhydride preferably includes phthalic acid, trimellitic acid, hemimellitic acid, pyromellitic acid and anhydrides of these. In particular, it is more preferred to use trimellitic anhydride which has good reactivity with the titanium compound (1) and gives high affinity between a polycondensation catalyst to be obtained and a polyester.

The reaction between the titanium compound (1) and the aromatic polyhydric carboxylic acid of the above formula (II) or its anhydride is preferably carried out by mixing the aromatic carboxylic acid or its anhydride with a solvent to dissolve part or the whole thereof in the solvent and dropwise adding the titanium compound (1) to the mixture. The reaction is carried out at a temperature of 0° C. to 200° C. for 30 minutes or more, preferably under heat at a temperature of 30 to 150° C. for 40 to 90 minutes. The reaction pressure in this case is not specially limited, and it is sufficiently an atmospheric pressure. The solvent can be properly selected from those which can dissolve part or the whole of a predetermined amount of the compound of the formula (II) or its anhydride, while it is preferably selected from ethanol, ethylene glycol, trimethylene glycol, tetramethylene glycol, benzene or xylene.

The reaction molar ratio of the titanium compound (1) and the compound of the formula (II) or its anhydride is not limited. However, when the ratio of the titanium compound (1) is too high, the color tone of a polyester obtained is sometimes deteriorated or its softening point is sometimes decreased. On the other hand, when the ratio of the titanium compound (1) is too low, the polycondensing reaction sometimes proceeds with difficulty. Therefore, it is preferred to control the reaction molar ratio of the titanium compound (1) and the compound of the formula (II) or its anhydride in the range of from 2/1 to 2/5. The reaction product obtained by the above reaction may be supplied to the above reaction with the phosphorus compound as it is, or it may be purified by recrystallization from a solvent including acetone, methyl alcohol and/or acetic acid and a purified product may be allowed to react with the phosphorus compound.

(Phosphorus Compound)

The phosphorus compound is represented by the following formula (III).

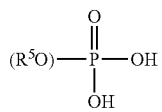

In the formula (III), $R^5$ is a substituted or non-substituted aryl group having 6 to 20 carbon atoms or a substituted or non-substituted alkyl group having 1 to 20 carbon atoms. The aryl group includes phenyl and naphthyl. The alkyl group includes methyl, ethyl, propyl, butyl, pentyl, hexyl, octyl, decyl, undecyl, dodecyl, tridecyl, tetradecyl, pentadecyl, hexadecyl and didecyl (R2O). The substituent on the aryl or alkyl group includes carboxyl, alkyl, hydroxyl and amino.

The phosphorus compound includes monoalkyl phosphates and monoaryl phosphates such as monomethyl phosphate, monoethyl phosphate, monotrimethyl phosphate, mono-n-butyl phosphate, monohexyl phosphate, monoheptyl phosphate, monooctyl phosphate, monononyl phosphate, monodecyl phosphate, monododecyl phosphate, monolauryl phosphate, monooleyl phosphate, monotetradecyl phosphate, monophenyl phosphate, monobenzyl phosphate, mono(4-dodecyl)phenyl phosphate, mono(4-methylphenyl)phosphate, mono(4-ethylphenyl)phosphate, mono(4-propylphnyl)phosphate, mono(4-dodecylphenyl)phosphate, monotolyl phosphate, monoxylyl phosphate, monobiphenyl phosphate, mononaphthyl phosphate and monoanthryl phosphate. These may be used singly or may be used as a mixture of the two or more of these, e.g., a mixture of monoalkyl phosphate and a monoaryl phosphate. When a mixture of the two or more of the above phosphorus compounds is used, the amount ratio of the monoalkyl phosphate is preferably 50% or more, more preferably 90% or more, and particularly preferably the content of the monoalkyl phosphate is 100%.

(Reaction Between Titanium Compound and Phosphorus Compound)

The titanium-phosphorus catalyst is a reaction product of a titanium compound and a phosphorus compound. The polyester resin produced in the presence of the titanium-phosphorus catalyst is excellent in thermal stability and moist heat resistance as compared with a case using germanium-, antimony- and other titanium-containing catalyst. When the titanium-phosphorus catalyst is used, the polyester resin maintains stability even when the amount of a color hue stabilizer and a thermal stabilizer during production is small as compared with a case using other catalyst. The decomposition of the additive is hence reduced under a hot environment or under a moist heat environment, so that it is assumed that the polyester is excellent in thermal stability and moist heat resistance.

In the titanium-phosphorus catalyst, the reaction molar ratio (mTi/mP) of the molar amount of a titanium compound as a titanium atom (mTi) and the molar amount of a phosphorus compound as a titanium atom (mP) is preferably in the range of from 1/3 to 1/1, more preferably in the range of from 1/2 to 1/1.

The molar amount of a titanium compound as a titanium atom refers to a total value of a product of a molar amount of each titanium compound contained in the titanium compound and the number of titanium atoms contained per molecule of the titanium compound. The molar amount of a phosphorus compound as a phosphorus atom refers to a total value of a product of a molar amount of each phosphorus compound contained in the phosphorus compound and the number of phosphorus atoms contained per molecule of the phosphorus compound. Since, however, the phosphorus compound of the formula (III) is a compound containing one phosphorus atom per molecule of the phosphorus compound, the molar amount of the phosphorus compound as a phosphorus atom is equivalent to the molar amount of the above phosphorus compound.

When the reaction molar ratio (mTi/mP) is greater than 1/1, i.e., when the amount of the titanium compound is too large, the color tone of a polyester resin obtained in the presence of the resultant catalyst is sometimes poor (the b value is too high), and the heat resistance thereof is sometimes low. When the reaction molar ratio (mTi/mP) is less than 1/3, i.e., when the amount of the titanium compound is too small, the catalytic activity of the resultant catalyst is sometimes poor in the reaction to produce the polyester.

The titanium-phosphorus catalyst is prepared, for example, by mixing the phosphorus compound of the formula (III) and a solvent, dissolving part or the whole of the phosphorus compound in the solvent and dropwise adding the titanium compound (1) or (2) to the mixture solution. The reaction is preferably carried out under heat at a temperature of 50 to 200° C., more preferably 70 to 150° C., preferably for 1 minute to 4 hours, more preferably 30 minutes to 2 hours. In this reaction, the reaction pressure is not specially limited, and the reaction may be carried out under any one of an elevated pressure (0.1 to 0.5 MPa), an atmospheric pressure or a reduced pressure (0.001 to 0.1 MPa), while it normally carried out under an atmospheric pressure.

Further, the solvent for dissolving the phosphorus compound of the formula (III) used for the reaction is not specially limited so long as it dissolves at least part of the phosphorus compound. For example, it is preferred to use a solvent containing at least one member selected from the group consisting of ethanol, ethylene glycol, trimethylene glycol, tetramethylene glycol, benzene and xylene. In particular, the same compound as a glycol component constituting the polyester to be finally obtained is preferably used as a solvent.

The reaction product of the titanium compound and the phosphorus compound is separated from the reaction system by means of centrifugal sedimentation treatment or filtering, and then may be used as a catalyst for producing the polyester without purification, or this separated reaction product may be purified by recrystallization from a recrystallizing agent such as acetone, methyl alcohol and/or water, and the resultant purified product may be used as a catalyst. Further, a reaction mixture containing the above reaction product may be used as a mixture containing the catalyst without separating the reaction product from the reaction system.

As a titanium-phosphorus catalyst, a reaction product of the compound of the formula (I) (in which k represents 1), i.e., titanium tetraalkoxide and the phosphorus compound of the formula (III) is preferably used.

Further, a compound represented by the following formula (IV) is preferably used as a titanium-phosphorus catalyst.

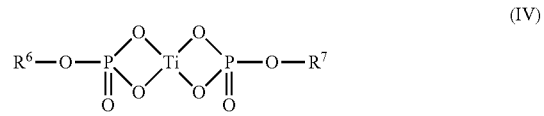

(IV)

In the formula, each of $R^6$ and $R^7$ is independently an alkyl group having 2 to 12 carbon atoms or an aryl group having 6 to 12 carbon atoms. The alkyl group having 2 to 12 carbon atoms includes ethyl, propyl, butyl, pentyl, hexyl, octyl, decyl, etc. The aryl group having 6 to 12 carbon atoms includes phenyl, naphthyl, etc.

The titanium-phosphorus catalyst of the formula (IV) has high catalytic activity, and a polyester resin produced in the presence thereof has an excellent color tone (low b value), has practically sufficiently low contents of acetaldehyde, a residual metal and a cyclic trimer of an ester of an aromatic dicarboxylic acid and an alkylene glycol and has practically sufficient polymer performances.

In the catalyst, the content of the compound of the above formula (IV) is preferably 50 mass % or more, more preferably 70 mass % or more.

With regard to the amount of the titanium-phosphorus catalyst to be used, the millimolar amount thereof as a titanium atom based on the total millimolar amount of aromatic dicarboxylic acid components contained in a polymerization starting material is preferably 2 to 40%, more preferably 5 to 35%, still more preferably 10 to 30%. When it is less than 2%, the promotion effect of the catalyst on the polycondensing reaction of the polymerization starting material is insufficient, the polyester production efficiency is insufficient, and in some cases, a polyester resin having a predetermined polymerization degree cannot be obtained. When it exceeds 40%, the color tone (b value) of a polyester resin obtained is insufficient and yellow-tinted, and its practical utility is sometimes decreased.

The method of producing an alkylene glycol ester of an aromatic dicarboxylic acid and/or a lower polymer thereof is not specially limited. In general, it is produced by reacting an aromatic dicarboxylic acid or its ester-forming derivative and an alkylene glycol or its ester-forming derivative under heat. For example, an ethylene glycol ester of terephthalic acid and/or a lower polymer thereof for use as a raw material for polyethylene terephthalate is produced by a method in which terephthalic acid and ethylene glycol are subjected directly to an esterification reaction, a method in which a lower alkyl ester of terephthalic acid and ethylene glycol are subjected to an ester-exchange reaction, or a method in which an addition reaction of ethylene oxide to terephthalic acid is carried out. The above alkylene glycol ester of an aromatic dicarboxylic acid and/or its lower polymer may contain, as an additional component, other dicarboxylic acid ester copolymerizable therewith so long as the effect of this invention is not substantially impaired. Specifically, it may be contained in an amount based on the total molar amount of acid components in the range of 10 mol % or less, preferably 5 mol % or less.

The copolymerizable additional component is selected from esters of acid components and glycol components or anhydrides thereof. Examples of the acid components include aliphatic and alicyclic dicarboxylic acids such as adipic acid, sebacic acid, 1,4-cyclohexanedicarboxylic acid and hydroxy-carboxylic acids such as β-hydroxyethoxybenzoic acid and p-oxybenzoic acid, and one or more members of these are used. Examples of the glycol components include aliphatic, alicyclic and aromatic diol compounds such as alkylene glycol constituted of two or more carbon atoms, 1,4-cyclohexanedimethanol, neopentyl glycol, bisphenol A and bisphenol S, and polyoxyalkylene glycol. The above additional component esters may be used singly or in combination of the two or more of these. However, the amount thereof for the copolymerization is preferably within the above range.

When terephthalic acid and/or dimethyl terephthalate is used as a starting material, a recycled dimethyl terephthalate obtained by depolymerization of polyalkylene terephthalate or recycled terephthalic acid obtained by hydrolysis thereof can be used in an amount of 70 mass % or more based on the mass of total acid components for constituting a polyester. In this case, the polyalkylene terephthalate as an end product is preferably polyethylene terephthalate, and it is preferred from the view point of effective use of natural resources to use, as raw materials for producing a polyester, recycled PET bottles, recycled fiber products, recycled polyester film products and polyester scrap which generated in the process of producing these products.

The method of obtaining dimethyl terephthalate by depolymerization of a recycled polyalkylene terephthalate is not specially limited, and any conventionally known method can be employed. For example, a polyester resin can be obtained by depolymerizing recycled polyalkylene terephthalate with ethylene glycol, then subjecting the depolymerization product to an ester-exchange reaction with a lower alcohol such as methanol, purifying the reaction mixture to recover a lower alkyl ester of terephthalic acid, subjecting it to an ester-exchange reaction with alkylene glycol and polycondensing the resultant phthalic acid/alkylene glycol. Further, the method of recovering terephthalic acid from the above-recovered dimethyl terephthalate is not specially limited, either, and any one of conventional methods may be used. For example, terephthalic acid can be recovered by recovering dimethyl terephthalate from a reaction mixture obtained by an ester-exchange reaction by a recrystallization method and/or distillation method and then heating it together with water at a high temperature under high pressure to carry out hydrolysis. Concerning impurities contained in the terephthalic acid obtained by the above method, preferably, the total content of 4-carboxybenzaldehyde, p-toluoylic acid, benzoic acid and dimethyl hydroxyterephthalate is 1 ppm or less. Further, the content of monomethyl terephthalate is preferably in the range of 1 to 5,000 ppm. The polyester resin can be produced by reacting the terephthalic acid recovered by the above method and alkylene glycol in an esterification reaction and polycondensing the resultant ester.

In the polyester resin (component B), the time for adding the catalyst to polymerization starting materials may be any stage before the start of a polycondensing reaction of the aromatic dicarboxylic acid alkylene glycol ester and/or its lower polymer, and the method of adding the same is not limited, either. For example, there may be employed a process in which the aromatic dicarboxylic acid alkylene glycol ester is prepared and a solution or slurry of the catalyst is added to this reaction system to start a polycondensing reaction, or a process in which when the above aromatic dicarboxylic acid alkylene glycol ester is prepared, a solution or slurry of the catalyst is added to the reaction system together with the starting materials or after they are charged.

The conditions for producing the polyester resin (component B) are not specially limited, either. In general, the polycondensing reaction is preferably carried out at a temperature of 230 to 300° C. under atmospheric pressure or under reduced pressure (0.1 Pa to 0.1 MPa), or in a mixture of these conditions, for 15 to 300 minutes.

In the polyester resin (component B), a reaction stabilizer such as trimethyl phosphate may be added to the reaction system at any stage of the production of the polyester as required. Further, at least one member of an antioxidant, an ultraviolet absorbent, a flame retardant, a fluorescent brightener, a flatting agent, a color corrector, an antifoaming agent and other additives may be incorporated to the reaction system as required. In particular, the polyester resin preferably contains an antioxidant containing at least one hindered phenol compound. The content thereof on the mass of the polyester resin is preferably 1 mass % or less. When it exceeds 1 mass %, the thermal degradation of the antioxidant itself may cause a disadvantage that a quality of obtained product may be deteriorated.

The hindered phenol compound includes pentaerythritol-tetrakis[3-(3,5-di-tert-butyl-4-hydroxyphenyl)propionate] and 3,9-bis(2-[3-(3-tert-butyl-4-hydroxy-5-methylphenyl) propionyloxy]-1,1-dimethylethyl)-2,4,8,10-tetraoxaspiro[5,5]undecane. It is also preferred to use these hindered-phenol-containing antioxidants in combination with a thioether-containing secondary antioxidant. The method of adding the above hindered-phenol-containing antioxidant to the polyester resin is not specially limited, while it is preferably added at any stage after completion of the ester-exchange reaction or the esterifying reaction and before completion of the polymerizing reaction.

For finely adjusting the color tone of the polyester resin to be obtained, a color corrector containing at least one member of organic blue pigments such as azo-, triphenylmethane-, quinoline-, anthraquinone- and phthalocyanine-containing blue pigments or inorganic blue pigments may be added to the reaction system at the stage of producing the polyester resin. There is no need to add, as a color corrector, any inorganic blue pigment containing cobalt that degrades the melt thermal stability of the polyester resin. Therefore, the polyester resin for use in this invention substantially does not contain cobalt.

The polyester resin (component B) preferably contains 0.001 to 50 ppm of titanium element derived from the above catalyst, more preferably 1 to 45 ppm of the same. When the content of titanium element is greater than 50 ppm, the thermal stability and color tone are degraded. When the content of titanium element is smaller than 0.001 ppm, it is greatly smaller than the content of a remaining catalyst in the polyester resin to be used and means that it is difficult to produce the polyester resin, whereby undesirably, the features of this invention such as excellent mechanical strength, thermal stability or moist heat resistance cannot be obtained.

Generally, the polyester resin (component B) preferably has an L value of 80.0 or more and a b value in the range of −2.5 to 5.0, these values being obtained by a Hunter color difference meter. When the L value of the polyester resin is less than 80.0, the whiteness of the polyester obtained is low, and it is hence sometimes difficult to obtain a high-whiteness molded article that can be supplied to practical use. Further, when the b value is less than −2.0, the polyester obtained has a decreased yellow tint but has an increased blue tint. When the b value is over 5.0, the polyester obtained has an intensified yellow tint, and may not sometimes supply the need for producing practically useful molded articles. In the polyester resin obtained according to the method of this invention, the L value is preferably 82 or more, particularly preferably 83 or more, and the b value is preferably in the range of −1.0 to 4.5, particularly preferably in the range of 0.0 to 4.0.

The intrinsic viscosity of the polyester resin (component B) is not limited, while it is preferably in the range of 0.40 to 1.2. When the above intrinsic viscosity is within this range, melt-molding is easy, and a molded article obtained from the polyester resin has high strength. The above intrinsic viscosity is more preferably in the range of 0.45 to 1.1, and particularly preferably 0.50 to 1.0. The polyester resin is measured for an intrinsic viscosity at a temperature of 35° C. by dissolving it in ortho-chlorophenol. The polyester resin obtained by solid phase polycondensation is generally used for bottles in many cases, and it is hence included in a polyester resin and has an intrinsic viscosity of 0.70 to 0.90. Preferably, the content of a cyclic trimer of an ester from the above aromatic dicarboxylic acid and alkylene glycol is 0.5 wt % or less, and the content of acetaldehyde is 5 ppm or less. The above cyclic trimer includes alkylene terephthalates such as ethylene terephthalate, trimethylene terephthalate, tetramethylene terephthalate and hexamethylene terephthalate and alkylene naphthalates such as ethylene naphthalate, trimethylene naphthalate, tetramethylene naphthalate and hexamethylene naphthalate.

In the resin composition of this invention, the content of the polyester resin (component B) per 100 parts by weight of total of the components A and B is 1 to 50 parts by weight, preferably 5 to 45 parts by weight, more preferably 15 to 35 parts by weight. When the above content is 1 part by weight of less, no effect on an improvement in chemical resistance is observed. When it exceeds 50 parts by weight, undesirably, the appearance is deteriorated and the moist heat resistance is decreased.

(Component C: Rubbery Polymer)

The rubbery polymer (component C) for use in this invention refers to a copolymer obtained by copolymerizing a rubber component with a vinyl monomer or a mixture with this monomer in a single stage or multiple stages.

The rubber component includes polybutadiene, diene-based copolymers (such as styrene-butadiene random copolymer and block copolymer, acrylonitrile-butadiene copolymer, alkyl(meth)acrylate and butadiene copolymer), polyisoprene, copolymers of ethylene and α-olefin (such as ethylene-propylene random copolymer and block copolymer and ethylene-butene random copolymer and block copolymer), copolymers of ethylene and unsaturated carboxylic ester (such as ethylene-methacrylate copolymer and ethylene-butyl acrylate copolymer), copolymers of ethylene and aliphatic vinyl (such as ethylene-vinyl acetate copolymer), terpolymers of ethylene, propylene and non-conjugated diene (such as ethylene-propylene-hexadiene copolymer), acrylic rubbers (such as polybutyl acrylate, poly(2-ethylhexyl acrylate) and copolymer of butyl acrylate and 2-ethylhexyl acrylate), and silicone-containing rubbers (such as polyorganosiloxane rubber, IPN type rubber formed of a polyorganosiloxane rubber component and a polyalkyl(meth)acrylate rubber component; i.e., a rubber having a structure in which two rubber components are inter-penetrating, and IPN type rubber formed of a polyorganosiloxane rubber component and a polyisobutylene rubber component). Of these, polybutadiene, diene-based copolymers, polyisoprene, acrylic rubber, a termpolymer of ethylene, propylene and non-conjugated diene and a silicone rubber are preferred since their effects are easily exhibited. Above all, diene-based copolymers are particularly preferred.

The weight average particle diameter of rubber particles of the above rubber component is preferably in the range of 0.10 to 1.0 µm, more preferably 0.15 to 0.8 µm, still more preferably 0.20 to 0.5 µm. When the weight average particle diameter of the rubber particles is smaller than 0.1 µm, undesirably, the impact improvement effect by a graft polymer is sometimes decreased. When it exceeds 1.0 µm, undesirably, the dispersion state with a thermoplastic resin is poor, and the impact resistance is sometimes decreased.

The weight average particle diameter of the rubber particles in the rubbery polymer (component C) is a value measured by means of a transmission electron microscope. Specifically, a drop of a rubbery polymer in an emulsion state was taken on a mesh for transmission electron microscope measurement and stained by the vapor of osmium tetraoxide or ruthenium tetraoxide, then, a photograph of the stained rubber polymer sample was taken with a transmission electron microscope (TECNAI G2, supplied by FEI Company, accelerating voltage 120 kv), and a weight average particle diameter was calculated from 200 pieces of rubber particles in the photographed image with an image processing soft (Nexus NewQube).

The diene-based copolymers are copolymers that are polymerized in a manner that the content of 1,3-butadiene as a main constituent unit is preferably 50 to 100% by weight, more preferably 65 to 100% by weight, still more preferably 75 to 100% by weight, and that the content of a vinyl monomer typified by stylen copolymerizable with 1,3-butadiene is 50 to 0% by weight, more preferably 35 to 0% by weight, still more preferably 25 to 0% by weight. When the content of 1,3-butadiene as a main constituent unit is smaller than 50% by weight, undesirably, sufficient impact resistance properties are sometimes not obtained.

The vinyl monomer for use in the component C includes, for example, aromatic vinyl monomers such as styrene, α-methylstyrene, P-methylstyrene, chlorostyrene, dibromostyrene and tribromostyrene, alkyl methacrylates such as methyl methacrylate, ethyl methacrylate, propyl methacrylate and butyl methacrylate, and alkyl acrylates such as methyl acrylate, ethyl acrylate, propyl acrylate, butyl acrylate and 2-ethylhexyl acrylate. It also includes a vinyl ether-containing monomer, vinylidene halide monomer and a vinyl monomer having a glycidyl group such as glycidyl acrylate in addition to the above monomers.

Further, crosslinkable monomers in the above vinyl monomers are copolymerizable with butadiene and vinyl monomers, and they are compounds having two or more independent C=C bonds in each molecule. Examples thereof include aromatic polyfunctional vinyl compounds such as divinylbenzene and divinyltoluene, α,β-unsaturated carboxylic esters of polyhydric alcohols such as ethylene glycol dimethacrylate and 1,3-butanediol diacrylate, allyl esters of α,β-unsaturated carboxylic acids such as trimethacrylic ester or triacrylic ester, ally acrylate and allyl methacrylate, and di- or trially compounds such as diallyl phthalate, diallyl sebacate and trially triazine. These vinyl monomers and crosslinking monomers may be used singly or in combination of the two or more of them, respectively.

Further, when a diene-based rubber component is formed, the polymerizing reaction therefor can use a chain transfer agent (initiator) such as t-dodecylmercaptane as required. When a latex of the diene-based rubber component is prepared, a bloating agent is added to the diene-based rubber component to control the weight average particle diameter of the diene-based rubber component. Examples of the above bloating agent include inorganic salts such as sodium chloride, potassium chloride, sodium sulfate, magnesium sulfate and aluminum sulfate, organic salts such as calcium acetate and magnesium acetate, inorganic acids such as sulfuric acid and hydrochloric acid, organic acids such as acetic acid and succinic acid, anhydrides of these organic acids, and a polymer latex containing a carboxylic acid.

The rubbery polymer (component C) for use in this invention preferably includes a styrene-based polymer. Since the styrene-based polymer has excellent moldability and has proper flowability and heat resistance, it is a rubbery polymer preferred for maintaining a balance among these properties.

The above styrene-based polymer is a polymer or copolymer of an aromatic vinyl compound in which a vinyl group or an alkylethenyl group (alkyl-modified vinyl group) is bonded to a benzene ring or a polymer obtained by copolymerizing the same with other vinyl monomer and rubber component copolymerizable with it as required.

The aromatic vinyl compound includes styrene, α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene and tribromostyrene. In particular, styrene is preferred.

The "other vinyl monomer" copolymerizable with the aromatic vinyl compound preferably includes vinyl cyanide compounds and (meth)acrylate ester compounds. The vinyl cyanide compounds include acrylonitrile and methacrylonitrile, and in particular, acrylonitrile is preferred.

The (meth)acrylate ester compounds include methyl (meth)acrylate, ethyl(meth)acrylate, propyl(meth)acrylate, isopropyl(meth)acrylate, butyl(meth)acrylate, amyl(meth)acrylate, hexyl(meth)acrylate, octyl(meth)acrylate, 2-ethylhexyl(meth)acrylate, cyclohexyl(meth)acrylate, dodecyl (meth)acrylate, octadecyl(meth)acrylate, phenyl(meth)acrylate and benzyl(meth)acrylate. The expression of "(meth)acrylate" indicates that it includes any one of methacrylate and acrylate, and the expression of (meth)acrylate ester indicates that it includes any one of methacrylate ester and acrylate ester. The (meth)acrylate ester compound particularly preferably includes methyl methacrylate.

The "other vinyl monomer" copolymerizable with the aromatic vinyl compound, different from the vinyl cyanide compound and (meth)acrylate ester compound, includes epoxy-group-containing methacrylate esters such as glycidyl methacrylate, maleimide-containing monomers such as maleimide, N-methylmaleimide and N-phenylmaleimide, α,β-unsaturated carboxylic acids such as acrylic acid, methacrylic acid, maleic acid, anhydrous maleic acid, phthalic acid and itaconic acid, and anhydrides thereof.

The above rubbery polymer copolymerizable with the aromatic vinyl compound includes polybutadiene, polyisoprene, diene-based copolymers (such as styrene-butadiene random copolymer and block copolymer, acrylonitrile-butadiene copolymer and alkyl(meth)acrylate and butadiene copolymer), copolymers of ethylene and α-olefins (such as ethylene-propylene random copolymer and block copolymer and ethylene-butene random copolymer and block copolymer), copolymers of ethylene and unsaturated carboxylate esters (such as ethylene-methacrylate copolymer and ethylene-butyl acrylate copolymer), copolymers of ethylene and aliphatic vinyl (such as ethylene-vinyl acetate copolymer), terpolymers of ethylene, propylene and non-conjugated dienes (such as ethylene-propylene-hexadiene copolymer), acrylic rubbers (such as polybutyl acrylate, poly(2-ethylhexyl acrylate) and copolymer of butyl acrylate and 2-ethylhexyl acrylate), and silicone-based rubbers (such as polyoroganosiloxane rubber, IPN type rubber formed of a polyorganosiloxane rubber component and a polyalkyl(meth)acrylate rubber component; i.e., rubber in which two rubber components are interpenetrating and IPN type rubber formed of a polyorganosiloxane rubber component and a polyisobutylene rubber component). Of these, polybutadiene, polyisoprene and a diene-based copolymer which easily exhibit their effects are preferred, and in particular, polybutadiene is preferred.

Specific examples of the above styrene-based copolymer include resins formed of styrene-based polymers such as HIPS resin, ABS resin, AES resin ASA resin, MBS resin, MABS resin, MAS resin and SMA resin, and styrene-based thermoplastic elastomers (such as (hydrogenated) styrene-butadiene-styrene copolymer and (hydrogenated) styrene-isoprene-styrene copolymer). The expression of "(hydrogenated)" means that it includes a resin that is not hydrogenated and a resin that is hydrogenated.

Above all, rubber-reinforced styrene-based copolymers such as HIPS resin, ABS resin, AES resin, ASA resin, MBA resin, MABS resin, MAS resin and styrene-based thermoplastic elastomer are suitable.

Of these, those having a rubber component formed of a diene-based copolymer are preferred, and in particular, ABS and MBS resins are preferred. Having excellent impact resistance, the ABS resin and MBS resin suitably exhibit the effect of this invention. The above AES resin refers to a copolymer resin mainly composed of acrylonitrile, ethylene-propylene rubber and styrene, the above ASA resin refers to a copolymer resin mainly composed of acrylonitrile, styrene and acrylic rubber, the above MABS resin refers to a copolymer resin mainly composed of methyl methacrylate, acrylonitrile, butadiene and styrene, the above MAS resin refers to a copolymer resin mainly composed of methylene methacrylate, acryl rubber and styrene, and the above SMA resin refers to a copolymer resin mainly composed mainly of styrene and maleic anhydride (MA).

The above styrene-based resins may be resins having high stereoregularity obtained by the activity of a catalyst such as a metallocene catalyst during their production, such as syndiotactic polystyrene. Further, there can be also used a polymer and a copolymer each having a narrow molecular weight distribution, a block copolymer, and a polymer and a copolymer each having high stereoregularity, obtained by the method of anion living polymerization, radical living polymerization, or the like.

Of these, an acrylonitrile-butadiene-styrene copolymer resin (ABS resin) is preferred. Further, a mixture of two or more styrene-based copolymers may be used.

The ABS resin for use in this invention refers to a mixture of a thermoplastic graft copolymer obtained by graft-polymerizing a vinyl cyanide compound and an aromatic vinyl compound with a diene-based rubber component and a copolymer of a vinyl cyanide compound and an aromatic vinyl compound. The diene-based rubber component for forming the above ABS resin is selected, for example, from rubbers having a glass transition temperature of −30° C. or lower such as polybutadiene, polyisoprene and a styrene-butadiene copolymer. The content of the rubber having a glass transition temperature of −30° C. or lower per 100% by weight of the ABS resin component is preferably 5 to 80% by weight, more preferably 8 to 50% by weight, particularly preferably 10 to 30% by weight.

As a vinyl cyanide compound to be grafted to the diene-based rubber component, in particular, acrylonitrile can be preferably used. As an aromatic vinyl compound to be grafted to the diene-based rubber component, in particular, styrene and α-methylstyrene can be preferably used. The content of the above component to be grafted to the diene-based rubber component per 100% by weight of the ABS resin component is preferably 95 to 20% by weight, particularly preferably 50 to 90% by weight. Per 100% by weight of total of the above vinyl cyanide compound and aromatic vinyl compound, preferably, the content of the vinyl cyanide compound is 5 to 50% by weight, and the content of the aromatic vinyl compound is 95 to 50% by weight. As part of the component to be grafted to the above diene-based rubber component, methyl(meth)acrylate, ethyl acrylate, maleic anhydride and N-substituted maleimide may be mixed and used. The content of these in the ABS resin component is preferably 15% by weight or less. Further, there may be used conventionally known substances, as required, such as an initiator, a chain transfer agent and an emulsifier conventionally known.

In the ABS resin, the rubber particle diameter is preferably 0.1 to 5.0 μm, more preferably 0.15 to 1.5 μm, particularly preferably 0.2 to 0.8 μm. Any one of the resin having one rubber particle diameter distribution or and the resin having rubber particle diameter distribution of two or more peaks can be used, and further, in morphology, it may be any one of the resin of which the rubber particles have a single phase and the resin of which the rubber particles have a salami structure in which each particle contains an occlusion layer around it.

Further, it is conventionally well known that an ABS resin contains a vinyl cyanide compound and an aromatic vinyl compound which are not grafted to a diene-based rubber component, and the ABS resin in this invention may contain free polymer components generated during polymerization. The reduced viscosity of the copolymer containing the above free vinyl cyanide compound and aromatic vinyl compound, as a reduced viscosity (30° C.) determined by the foregoing method, is preferably 0.2 to 1.0 dl/g, more preferably 0.3 to 0.7 dl/g.

The content of the grafted vinyl cyanide compound and aromatic vinyl compound based on the diene-based rubber component, as a graft ratio (weight %), is preferably 20 to 200%, more preferably 20 to 70%.

The above ABS resin may be produced by any method of bulk polymerization, suspension polymerization and emulsion polymerization, while an ABS resin produced by bulk polymerization is particularly preferred. Further, the above bulk polymerization method typically includes a continuous bulk polymerization method (so-called Toray method) described in Chemical Engineering, Vol. 48, No. 6, page 415 (1984) and a continuous bulk polymerization method (so-called Mitsuitoatsu method) described in Chemical Engineering, Vol. 53, No. 6, page 423 (1989). As the ABS resin in this invention, any one of the above ABS resins can be suitably used. The polymerization may be carried out by a single stage or by a multiple stages. Further, there can be suitably used a blend of an ABS resin obtained by the above production method with a vinyl compound polymer obtained by separate copolymerization of an aromatic vinyl compound and a vinyl cyanide component.

The above ABS resin of which the alkali (alkaline earth) metal content is reduced is preferred in view of excellent thermal stability and hydrolysis resistance. In the styrene-based resin, the content of an alkali (alkaline earth) metal is preferably less than 100 ppm, more preferably less than 80 ppm, still more preferably less than 50 ppm, particularly preferably less than 10 ppm. The ABS resin according to a bulk polymerization method is also suitably used from the above viewpoint. When an emulsifier is used in the ABS resin, suitably in relation to the above excellent thermal stability and hydrolysis resistance, the emulsifier is selected from sulfonic acid salts, and more suitably from alkylsulfonic acid salts. Further, when a coagulating agent is used, the coagulating agent is suitably sulfuric acid or an alkaline earth metal salt of sulfuric acid.

Another rubbery polymer preferred in this invention is selected from those which contain no styrene component. The polymer containing no styrene component has excellent moldability and proper flowability and heat resistance, and in addition to these, it is also excellent in chemical resistance, so that it is a preferred rubbery polymer for maintaining a balance among these properties. The polymer containing no styrene component includes polymers obtained by polymerization of vinyl monomers other than styrene-based monomers and rubber components containing no styrene component.

The vinyl monomer other than the styrene-based monomer includes a vinyl cyanide compound and a (meth)acrylate ester compound. The vinyl cyanide compound includes acrylonitrile and methacrylonitrile, and in particular, acrylonitrile is preferred. The (meth)acrylate ester compound includes methyl(meth)acrylate, ethyl(meth)acrylate, propyl(meth)acrylate, isopropyl(meth)acrylate, butyl(meth)acrylate, amyl(meth)acrylate, hexyl(meth)acrylate, octyl(meth)acrylate, 2-ethylhexyl(meth)acrylate, cyclohexyl(meth)acrylate, dodecyl(meth)acrylate, octadecyl(meth)acrylate, phenyl(meth)acrylate and benzyl(meth)acrylate. The expression of (meth)acrylate indicates that it includes both methacrylate and acrylate, and the expression of (meth)acrylate ester indicates that it includes both methacrylate ester and acrylate ester. In particular, the (meth)acrylate ester compound is preferably methyl methacrylate.

The vinyl monomer other than the vinyl cyanide compound and (meth)acrylate ester compound includes epoxy-group-containing methacrylates such as glycidyl methacrylate, maleimide-containing monomers such as maleimide, N-methylmaleimide and N-phenylmaleimide, $\alpha,\beta$-unsaturated carboxylic acids such as acrylic acid, methacrylic acid, maleic acid, anhydrous maleic acid, phthalic acid and itaconic acid, and anhydrides thereof.

The rubbery component containing no styrene component includes polybutadiene, polyisoprene, styrene-free diene-based copolymers (such as acrylonitrile-butadiene copolymer and alkyl(meth)acrylate and butadiene copolymer), copolymers of ethylene and α-olefins (such as ethylene-propylene random copolymer and block copolymer and ethylene-butene random copolymer and block copolymer), copolymers of ethylene and unsaturated carboxylate esters (such as ethylene-methacrylate copolymer and ethylene-butyl acrylate copolymer), copolymers of ethylene and aliphatic vinyl (such as ethylene-vinyl acetate copolymer), terpolymers of ethylene, propylene and non-conjugated dienes (such as ethylene-propylene-hexadiene copolymer), acrylic rubbers (such as polybutyl acrylate, poly(2-ethylhexyl acrylate) and copolymer of butyl acrylate and 2-ethylhexyl acrylate), and silicone-based rubbers (such as polyoroganosiloxane rubber, IPN type rubber formed of a polyorganosiloxane rubber component and a polyalkyl(meth)acrylate rubber component; i.e., rubber in which two rubber components are interpenetrating and IPN type rubber formed of a polyorganosiloxane rubber component and a polyisobutylene rubber component). Of these, polybutadiene, polyisoprene, a diene-based copolymer, an acrylic rubber and a silicone-based rubber which easily exhibit their effects are preferred, and in particular, polybutadiene s preferred.

The weight average particle diameter of the above rubbery polymer containing no styrene component is preferably in the range of 0.10 to 1.0 more preferably 0.15 to 0.8 μm, still more preferably 0.20 to 0.5 μm. When the weight average particle diameter of the rubber particles is smaller than 0.1 μm, undesirably, the impact-improving effect produced by the addition of a graft polymer is decreased. When it exceeds 1.0 μm, undesirably, the state of being dispersed with a thermoplastic resin is poor, and the impact resistance is degraded.

The weight average particle diameter of the rubber particles is a value measured by means of a transmission electron microscope. Specifically, a drop of a rubbery polymer in an emulsion state was taken on a mesh for transmission electron microscope measurement and stained by the vapor of osmium tetraoxide or ruthenium tetraoxide, then, a photograph of the stained rubber polymer sample was taken with a transmission electron microscope (TECNAI G2, supplied by FEI Company, accelerating voltage 120 kv), and a weight average particle diameter was calculated from 200 pieces of rubber particles in the photographed image with an image processing soft (Nexus NewQube).

The above diene-based rubber component is a copolymer obtained by copolymerization of preferably 50 to 100% by weight, more preferably 65 to 100% by weight, still more preferably 75 to 100% by weight of 1,3-butadiene for a main constituent unit and preferably 50 to 1% by weight, more preferably 35 to 1% by weight, still more preferably 25 to 1% by weight of a vinyl monomer copolymerizable therewith, typified by methyl methacrylate. When the content of 1,3-butadiene for a main constituent unit is smaller than 50% by weight, undesirably, no sufficient impact property can be obtained in some cases.

The vinyl monomer typified by methyl methacrylate used for forming the above diene-based rubber component includes alkyl methacrylates such as methyl methacrylate, ethyl methacrylate, propyl methacrylate and butyl methacrylate and alkyl acrylates such as methyl acrylate, ethyl acrylate, propyl acrylate, butyl methacrylate and 2-ethylhexyl acrylate. Besides the above monomers, it also includes a vinyl ether-based monomer, a halogenated vinylidene monomer and a vinyl-based monomer having a glycidyl group such as glycidyl acrylate.

Further, crosslinkable monomers in the above vinyl monomers are copolymerizable with butadiene and vinyl monomers, and they are compounds having two or more independent C=C bonds in each molecule. Examples thereof include aromatic polyfunctional vinyl compounds such as divinylbenzene and divinyltoluene, α,β-unsaturated carboxylic esters of polyhydric alcohols such as ethylene glycol dimethacrylate and 1,3-butanediol diacrylate, allyl esters of α,β-unsaturated carboxylic acids such as trimethacrylic ester or triacrylic ester, ally acrylate and allyl methacrylate, and di- or trially compounds such as diallyl phthalate, diallyl sebacate and trially triazine.

The above vinyl monomers and crosslinking monomers may be used singly or in combination of the two or more of them, respectively.

Further, when a diene-based rubber component is formed, the polymerizing reaction therefor can be used a chain transfer agent (initiator) such as t-dodecylmercaptane as required. When a latex of the diene-based rubber component is prepared, a bloating agent is added to the diene-based rubber component to control the weight average particle diameter of the diene-based rubber component. Examples of the above bloating agent include inorganic salts such as sodium chloride, potassium chloride, sodium sulfate, magnesium sulfate and aluminum sulfate, organic salts such as calcium acetate and magnesium acetate, inorganic acids such as sulfuric acid and hydrochloric acid, organic acids such as acetic acid and succinic acid, anhydrides of these organic acids, and a polymer latex containing a carboxylic acid.

The rubbery polymer containing no styrene component for use in this invention is prepared by graft-polymerizing a latex of the rubbery component having the above constitution with an alkyl(meth)acrylate monomer or a mixture of alkyl(meth) acrylate with other monomer copolymerizable with the same in a single stage or multiple stages.

That is, the monomer for use in the above graft-polymerization includes alkyl methacrylates such as methyl methacrylate and ethyl methacrylate, alkyl acrylates such as methyl acrylate, ethyl acrylate and butyl acrylate, and others including styrenes such as styrene, α-methylstyrene or various halogen-substituted and/or alkyl-substituted styrenes, and vinyl monomers having a glycidyl group such as glycidyl acrylate, glycidyl methacrylate and ally glycidyl ether. Further, the above vinyl monomers which are crosslinking monomers can be used in combination with the above vinyl monomers. When used as a mixture with the alkyl(meth)acrylate, these vinyl monomers and crosslinking monomers may be used singly or in combination of the two or more of them, respectively.

In the graft polymerization, preferably, the amount of the monomer or monomer mixture to be used based on 40 to 90 parts by weight of the diene-based rubber component is 60 to 10 parts by weight, more preferably, the amount of the monomer or monomer mixture to be used based on 42 to 85 parts by weight of the diene-based rubber component is 58 to 15 parts by weight, and still more preferably, the amount of the monomer or monomer mixture to be used based on 45 to 80 parts by weight of the diene-based rubber component is 55 to 20 parts by weigh. Further, when the monomer mixture is used, the content of the alkyl(meth)acrylate monomer based on the total of the monomer mixture is preferably at least 25% by weight, more preferably 40% by weight or more.

The graft-polymerization itself may be carried out by adding the monomers or a mixture of the monomers at once and polymerizing them at one stage, or by adding the monomers or a mixture of the monomers at least twice to polymerize them at a plurality of stages.

As a graft-polymerization method, there is employed the means of emulsion polymerization. When the graft-polymerization is carried out, there can be used a polymerization initiator which is selected from persulfates such as potassium persulfate, ammonium persulfate and sodium persulfate, organic peroxides such as t-butyl hydroperoxide, cumene hydroperoxide, benzoyl peroxide, lauryl peroxide and diisopropylbenzene hydroperoxide, and azo compounds such as azobisisobutylonitrile and azobisisovaleronitrile. Besides these, a combination of the above oxidizing compound(s) with sulfite, bisulfate, thiosulfate, primary metal salt, sodium formaldehyde-sulfoxilate or dextrose can be used as a redox initiator.

The reaction temperature in the graft polymerization can be selected, for example, in the range of 40 to 80° C. depending upon the kind of the polymerization initiator used. When emulsion polymerization is carried out, the emulsifier for the rubbery polymer latex can be selected from known emulsifiers as required.

The thus-obtained rubbery polymer containing no styrene component is solidified by adding a proper antioxidant and an additive or no additive as required to the reaction solution and spray-drying it (directly forming it into a powder), or by adding a coagulant selected from acids such as sulfuric acid, hydrochloric acid and phosphoric acid or salts such as calcium chloride or sodium chloride to the reaction solution as required and further heat-treating it. The above solidification is followed by dehydration and washing and then followed finally by drying to form a powder, which is used.

The content of the component C per 100 parts by weight of total of the components A and B is preferably 1 to 50 parts by weight, more preferably 1 to 45 parts by weight, still more preferably 2 to 40 parts by weight. When the content of the component C is less than 1 part by weight, undesirably, the impact-improvement effect by the addition of the rubbery polymer is decreased. Further, when it is larger than 50 parts by weight, undesirably, the heat resistance is greatly degraded, and there is involved a defective appearance caused by insufficient thermal stability.

The component C is preferably a rubbery polymer which is obtained by copolymerizing acrylic monomers or a mixture of acrylic monomer(s) with a monomer copolymerizable with the acrylic monomer(s) in the presence of at least one rubber component selected from the group consisting of a diene-based rubber, an acrylic rubber and a silicone-based rubber.

(Other Additives)

The resin composition of this invention can contain various stabilizers for stabilizing a decrease in molecular weight and a color hue during molding, a mold release agent, a coloring agent, an impact modifier and a flame retardant.

(i) Flame Retardant

The resin composition of this invention can contain various compounds that are known as flame retardants. In addition, when a compound for use as a flame retardant is incorporated, not only it improves the flame retardancy, but also it brings improvements, for example, in antistatic property, flowability, rigidity and thermal stability on the basis of the properties of the component.

The above flame retardant includes (1) organometal-salt-containing flame retardants (such as organic sulfonic acid alkali (alkaline earth) metal salt, boric-acid-metal-salt-containing flame retardant and stannic-acid-metal-salt-containing flame retardant), (2) organic-phosphorus-containing flame retardants (such as monophosphate compound, phosphate oligomer compound, phoshonate oligomer compound, phosphonitrile oligomer component and phosphonic acid amide compound), (3) silicon flame retardants containing silicone compounds, and (4) halogen-containing flame retardants (such as brominated epoxy resin, brominated polystyrene, brominated polycarbonate (including an oligomer), brominated polyacrylate and chlorinated polyethylene).

(1) Organometal-Salt-Containing Flame Retardant

The organometal-salt-containing flame retardant is advantageous in that it almost maintains heat resistance and imparts the resin composition with an antistatic property. The organometal-salt-containing flame retardant most advantageously used in this invention is a fluorine-containing organometal salt compound. The fluorine-containing organometal salt compound refers to a metal salt compound composed of an anionic component formed of an organic acid having a fluorine-substituted hydrocarbon group and a cationic component formed of a metal ion. More specific examples thereof include a metal salt of fluorine-substituted organic sulfonic acid, a metal salt of fluorine-substituted organic sulfuric ester and a metal salt of fluorine-substituted organic phosphoric ester. The fluorine-containing metal salt compounds can be used singly or as a mixture of the two or more of them. Of these, a metal salt of fluorine-substituted organic sulfonic acid is preferred, and a metal salt of sulfonic acid having a perfluoroalkyl group is particularly preferred. The number of carbon atoms of the perfluoroalkyl group is preferably in the range of 1 to 18, more preferably 1 to 10, still more preferably 1 to 8.

The metal for constituting the metal ion of the organometal-salt-containing flame retardant is an alkali metal or an alkaline earth metal, and the alkali metal includes lithium, sodium, potassium, rubidium and cesium. The alkaline earth metal includes beryllium, magnesium, calcium, strontium and barium. The alkali metal is more preferred. Suitably, therefore, the organometal-salt-containing flame retardant is a perfluoroalkylsulfonic acid alkali metal salt. Of the above alkali metals, rubidium and cesium are suitable when transparency is more highly required. Since, however, these are not generally used and are hard to purify, they are consequently sometimes disadvantageous in respect of a cost. On the other hand, lithium and sodium are advantageous in cost and flame retardancy, while they are sometimes disadvantageous in transparency. While taking account of these, alkali metals can be selected for use in the perfluoroalkylsulfonic acid alkali metal salt, while perfluoroalkylsulfonic acid potassium salt that is well-balanced in properties is suitable in any respect. This potassium salt and a perfluoroalkylsulfonic acid alkali metal salt composed of other alkali metal can be also used in combination.

The above perfluoroalkylsulfonic acid alkali metal salt includes potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate, and rubidium perfluorohexanesulfonate. These may be used singly or in combination of the two or more of them. Of these, potassium perfluorobutanesulfonate is particularly preferred.

In the above fluorine-containing organometal salt, the content of fluoride ion measured by an ion chromatography method is preferably 50 ppm or less, more preferably 20 ppm or less, still more preferably 10 ppm or less. With a decrease in the content of fluoride ion, the flame retardancy and light resistance becomes better. The lower limit of the content of fluoride ion can be rendered substantially 0, while it is practically preferably about 0.2 ppm when a balance between the number of purification steps and the effect is taken into account. For example, the perfluoroalkylsulfonic acid alkali metal salt for the above fluoride ion content is purified as follows. The perfluoroalkylsulfonic acid alkali metal salt is dissolved in ion-exchanged water in an amount 2 to 10 times the weight of this metal salt in the range of 40 to 90° C. (more preferably 60 to 85° C.). The above perfluoroalkylsulfonic acid alkali metal salt is generated by the method of neutralizing perfluoroalkylsulfonic acid with a carbonate or hydroxide of an alkali metal or the method of neutralizing perfluoroalklsulfonyl fluoride with a carbonate or hydroxide of an alkali metal (more preferably by the latter method). The above ion-exchanged water is particularly preferably water having an electric resistance value of 18 MΩ·cm or more. A solution of the metal salt in the ion-exchanged water is stirred at the above temperature for 0.1 to 3 hours, more preferably for 0.5 to 2.5 hours. Then, the above solution is cooled to 0 to 40° C., more preferably to a range of 10 to 35° C. By cooling, a crystal is precipitated. The precipitated crystal is recovered by filtering. In this manner, suitable purified perfluoroalkylsulfonic acid alkali metal salt is produced.

The content of the fluorine-containing organometal salt compound per 100 parts by weight of total of the components A and B is preferably 0.005 to 0.6 part by weight, more preferably 0.005 to 0.2 part by weight, still more preferably 0.008 to 0.13 part by weight. In the above preferred range, the fluorine-containing organometal salt compound more exhibits effects (e.g., flame retardancy and antistatic property) which are expected by the incorporation thereof, and the adversary effect on the light resistance of the resin composition is decreased.

As an oganometal-salt-containing flame retardant other than the above fluorine-containing organometal salt compounds, an organic sulfonic acid metal salt containing no fluorine atom is suitable. Examples of the above metal salt include an alkali metal salt of an aliphatic sulfonic acid, an alkaline earth metal salt of an aliphatic sulfonic acid, an alkali metal salt of an aromatic sulfonic acid and an alkaline earth meal salt of an aromatic sulfonic acid (these contain no fluorine atom).

The aliphatic sulfonic acid metal salt preferably includes alkylsulfonic acid alkali (alkaline earth) metal salts. These may be used singly or in combination of the two or more of them (the expression of the above alkali (alkaline earth) metal salts is used to mean that it includes any one of alkali metal salts and alkaline earth metal salts). Examples of alkanesulfonic acids for use in the above alkylsulfonic acid alkali (alkaline earth) metal salts preferably include methanesulfonic acid, ethanesulfonic acid, propanesulfonic acid, butanesulfonic acid, methylbutanesulfonic acid, hexanesulfonic acid, heptanesulfonic acid and octansulfonic acid. These may be used singly or in combination of the two or more of them.

The aromatic sulfonic acid for use in the aromatic sulfonic acid alkali (alkaline earth) metal salt includes at least one acid selected from the group consisting of sulfonic acid of monomeric or polymeric aromatic sulfide, sulfonic acid of aromatic carboxylic acid or ester, sulfonic acid of monomeric or polymeric aromatic ether, sulfonic acid of aromatic sulfonate, monomeric or polymeric aromatic sulfonic acid, monomeric or polymeric aromatic sulfonesulfonic acid, sulfonic acid of aromatic ketone, a heterocyclic sulfonic acid, sulfonic acid of aromatic sulfoxide and a condensate of aromatic sulfonic acid by methylene type bond. These may be used singly or in combination of the two or more of them.

Specific examples of the aromatic sulfonic acid alkali (alkaline earth) metal salt include disodium diphenylsulfide-4,4'-disulfonate, dipotassium diphenylsulfide-4,4'-disulfonate, potassium 5-sulfoisophthalate, sodium 5-sulfoisophthalate, polysodium polyethyleneterephthalate polysulfonate, potassium 1-methoxynaphthalene-4-sulfonate, disodium 4-dodecylphenyl ether disulfonate, polysodium poly(2,6-dimethylphenylene oxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzenesulfonate, sodium benzenesulfonate, strontium benzenesulfonate, magnesium benzenesulfonate, dipotassium p-benzenesulfonate, dipotassium naphthalene-2,6-disulfonate, potassium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzopnenone-3,3'-disulfonate, disodium thiophene-2,5-disulfonate, dipotassium thiophene-2,5-disulfonate, potassium thiophene-2,5-disulfonate, sodium benzothiphenesulfonate, potassium diphenylsulfoxide-4-sulfonate, a formalin condensate of sodium naphthalenesulfonate, and a formalin condensate of sodium anthracenesulfonate.

The alkali (alkaline earth) metal salt of sulfuric ester includes alkali (alkaline earth) metal salts of sulfuric esters of monohydric or polyhydric alcohols. The above sulfuric esters of monohydric and/or polyhydric alcohols include methylsulfuric ester, ethylsulfuric ester, laurylsulfuric ester, hexadecylsulfuric ester, sulfuric ester of polyoxyethylenealkyl phenyl ether, mono-, di-, tri- or tetrasulfuric ester of pentaerythritol, sulfuric ester of lauric acid monoglyceride, sulfuric ester of palmitic acid monoglyceride and sulfuric ester of stearic acid monoglyceride. These alkali (alkaline earth) metal salt of sulfuric ester, an alkali (alkaline earth) metal salt of laurylsufuric ester is preferred.

Further, the other alkali (alkaline earth) metal salt includes alkali (alkaline earth) metal salts of aromatic sulfoneamides such as alkali (alkaline earth) metal salts of saccharin, N-(p-tolylsulfonyl)-p-toluenesulfoneamide, N—(N'-benzylaminocarbonyl)sulfanilamide and N-(phenylcarboxyl)sulfanylimide.

Of the above metal salts, the metal salt of organic sulfonic acid containing no fluorine atom is preferably aromatic sulfonic acid alkali (alkaline earth) metal salt, and potassium salt is particularly preferred. When the above aromatic sulfonic acid alkali (alkaline earth) metal salt is incorporated, the content thereof per 100 parts by weight of total of the components A and B is preferably 0.001 to 1 part by weight, more preferably 0.005 to 0.5 part by weight, still more preferably 0.01 to 0.1 part by weight.

(2) Organic-Phosphorus-Containing Flame Retardant

As an organic phosphorus-containing flame retardant, an arylphosphate compound is preferred. The above phosphate compound is generally excellent in color hue and produces less or no adversary effect on light high reflecting properties. Further, the phosphate compound has a plasticizing effect and is hence advantageous in that the resin composition of this invention can be improved in moldability. The above phosphate compound can be selected from various phosphate compounds that are conventionally known as flame retardants, while it in particular suitably includes one or two or more phosphate compounds of the following formula (5).

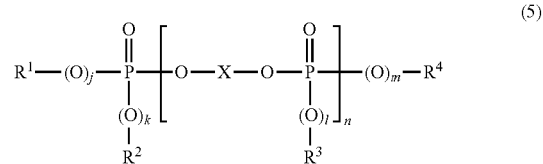

(5)

In the above formula, X is a divalent group derived from hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone and bis(4-hydroxyphenyl)sulfide. Each of j, k, 1 and m is independently 0 or 1, n is an integer of 0 to 5, or an average value of 0 to 5 when a mixture of phosphoric esters having different n's in number, and each of $R^1$, $R^2 R^3$ and $R^4$ is independently a monohydric phenol residue derived from a phenol on which one or more halogen atoms are substituted or not substituted, cresol, xylenol, isopropylphenol, butylphenol and p-cumylphenol.

The above phosphate compounds may be a mixture of compounds having different n's in number, and in this mixture, an average of n's in number is preferably in the range of 0.5 to 1.5, more preferably 0.8 to 1.2, still more preferably 0.95 to 1.15, particularly preferably 1 to 1.14.

Specific examples of the dihydric phenol from which the above X is derived preferably include resorcinol, bisphenol A and dihydroxydiphenyl.

Specific examples of the monohydric phenol from which the above $R^1$, $R^2$, $R^3$ and $R^4$ are derived preferably include phenol and 2,6-dimethylphenol.

The above monohydric phenol may be substituted with a halogen atom, and specific examples of the phosphate compound having a group derived from the above monohydric phenol include tris(2,4,6-tribromophenyl)phosphate and tris(2,4-dibromophenyl)phosphate and tris(4-bromophenyl)phosphate.

Specific examples of the phosphate compound which is not substituted with a halogen atom include monophosphate compounds such as triphenyl phosphate and tri(2,6-xylyl)phosphate, a phosphate oligomer composed mainly of resorcinolbis(di(2,6-xylyl)phosphate), a phosphate oligomer composed mainly of 4,4-dihydroxydiphenylbis(diphenyl phosphate) and a phosphoric ester oligomer composed mainly of bisphenol A bis(diphenyl phosphate). The above "being composed mainly of" means that an oligomer may contain a small amount of other component having a different polymerization degree, and it means that the content of a component of the phosphate compounds of the above formula (5) in which n=1 is 80% by weight or more, more preferably 85% by weight or more, still more preferably 90% by weight or more.

The content of the organic-phosphorus-containing flame retardant per 100 parts by weight of total of the components A and B is preferably 1 to 20 parts by weight, more preferably 2 to 10 parts by weight, still more preferably 2 to 7 parts by weight.

(3) Silicone-Containing Flame Retardant

The silicone compound used as a flame retardant improves the flame retardancy owing to a chemical reaction during combustion. The above compound can be selected from various compounds that are conventionally proposed as flame retardants for aromatic polycarbonate resins. It is said that a silicone compound imparts a polycarbonate resin with a flame-retarding effect during combustion owing to a structure formed by bonding to each other or bonding to a component derived from a resin, or owing to a reductive reaction during the formation of the above structure. Preferably, therefore, the silicone compound contains a group having high activity in the above reaction, and more specifically, it preferably contains a predetermined amount of at least one group selected from an alkoxy group and hydrogen (i.e., Si—H group). The content of the above group (alkoxy group, Si—H group) is preferably in the range of 0.1 to 1.2 mol/100 g, more preferably in the range of 0.12 to 1 mol/100 g, still more preferably in the range of 0.15 to 0.6 mol/100 g. The above content can be determined by measuring an amount of hydrogen or an alcohol that is generated per unit weight of a silicone compound according to alkali decomposing method. The alkoxy group is preferably an alkoxy group having 1 to 4 carbon atoms, and particularly preferably a methoxy group.

In general, the structure of the silicone compound is constituted by combining the following four types of siloxane units optionally. That is, they are;

M units: Monofunctional siloxane units such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ and $(CH_3)(C_6H_5)(CH_2=CH)SiO_{1/2}$.

D units: Difunctional siloxane units: $(CH_3)_2SiO$, $H(CH_3)SiO$, $H_2SiO$, $H(C_6H_5)SiO$, $(CH_3)(CH_2=CH)SiO$ and $(C_6H_5)_2SiO$.

T units: Trifunctional siloxane units such as $(CH_3)SiO_{3/2}$, $(C_3H_7)SiO_{3/2}$, $HSiO_{3/2}$, $(CH_2=CH)SiO_{3/2}$ and $(C_6H_5)SiO_{3/2}$.

Q unit: Tetrafunctional siloxane unit represented by $SiO_2$.

The structure of the silicone compound for use as a silicone-containing flame retardant specifically includes $D_n$, $T_p$, $M_mD_n$, $M_mT_p$, $M_mQ_q$, $M_mD_nT_p$, $M_mD_nQ_q$, $M_nT_pQ_q$, $M_mD_nT_pQ_q$, $D_nT_p$, $D_nQ_q$ and $D_nT_pQ_q$ as rational formulae. Of these, the structure of the silicone compound is preferably $M_mD_n$, $M_mT_p$, $M_mD_nT_p$ or $M_mD_nQ_q$, more preferably $M_mD_n$ or $M_mD_nT_p$.

In the above rational formulae, each of the factors m, n, p and q is an integer of 1 or more which shows the polymerization degree of each siloxane unit, and the total of factors in each rational formula is an average polymerization degree of the silicone compound. The above average polymerization degree is preferably in the range of 3 to 150, more preferably in the range of 3 to 80, still more preferably in the range of 3 to 60, particularly preferably in the range of 4 to 40. A silicone compound becomes more excellent in flame retardancy as the range of the above average polymerization degree becomes more particularly preferred range. Further, when a silicone compound containing a predetermined amount of an aromatic group is incorporated, a resin composition is excellent in transparency and color hue as will be described later.

Further, when any one of m, n, p and q is a value of 2 or more, a siloxane unit with the factor can be 2 or more siloxane units in which bonding hydrogen atom or organic residues are different.

The silicone compound may have a linear or branched structure. The organic residue bonding to the silicon atom is preferably an organic residue having 1 to 30 carbon atoms, more preferably 1 to 20 carbon atoms. The organic residue specifically includes an alkyl group such as methyl, ethyl, propyl, butyl, hexyl and decyl, a cycloalkyl group such as cyclohexyl, an aryl group such as phenyl and aralkyl group such as tolyl. More preferably, it is an alkyl group having 1 to 8 carbon atoms, an alkenyl group or an aryl group. The alkyl group is particularly preferably an alkyl group having 1 to 4 carbon atoms such as methyl, ethyl, propyl, etc.

Further, the silicone compound for use as a silicone-containing flame retardant preferably contains an aryl group. More preferably, it is a silicone compound containing an aromatic group represented by the following formula (6) and having is content of 10 to 70% by weight (more preferably 15 to 60% by weight).

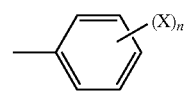

(6)

In the formula (6), each of X's is independently an OH group or a monovalent organic residue having 1 to 20 carbon atoms, and n is an integer of 0 to 5. In the formula (6), further, when n is 2 or more, each of X's may be different from other or every other.

The silicone compound for use as a silicone-containing flame retardant may contain a reactive group other than the above S—H group and alkoxy group, and examples of such a reactive group include an amino group, a carboxyl group, an epoxy group, a vinyl group, a mercapto group and a methacryloxy group.

The silicone compound having an Si—H group preferably includes, for example, a silicone compound containing at least one of constituents units of the following formulae (7) and (8).

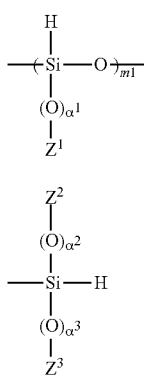
(7)

(8)

In the formulae (7) and (8), each of $Z^1$ to $Z^3$ is independently a hydrogen atom, an organic residue having 1 to 20 carbon atoms or a compound represented by the following formula (9). Each of α1 to α3 is independently 0 or 1, and m1 is an integer of 0 or 1 or more. Further, when m1 in the formula (7) is 2 or more, each recurring unit may be different from other or every other one.

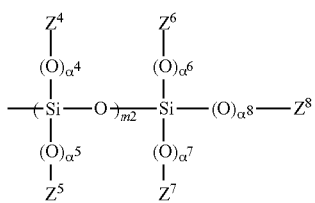
(9)

In the formula (9), each of $Z^4$ to $Z^8$ is independently a hydrogen atom or an organic residue having 1 to 20 carbon atoms. Each of α4 to α8 is independently 0 or 1, and m2 is an integer of 0 or 1 or more. Further, the formula (9), when m2 is 2 or more, each recurring unit may be different from other or every other one.

In the silicone-containing compound for use in the silicone-containing flame retardant, the silicone compound having an alkoxy group includes, for example, at one compound selected from the compound represented by the formulae (10) and (11).

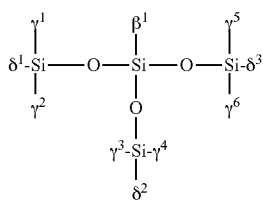
(10)

In the formula (10), $\beta^1$ is a vinyl group, an alkyl group having 1 to 6 carbon atoms, a cycloalkyl group having 3 to 6 carbon atoms or an aryl or aralkyl group having 6 to 12 carbon atoms. Each of $\gamma^1$, $\gamma^2$, $\gamma^3$, $\gamma^4$, $\gamma^5$ and $\gamma^6$ is an alkyl group having 1 to 6 carbon atoms, a cycloalkyl group having 3 to 6 carbon atoms or an aryl or aralkyl group having 6 to 12 carbon atoms, and at least one group is an aryl or aralkyl group. Each of $\delta^1$, $\delta^2$ and $\delta^3$ is an alkoxy group having 1 to 4 carbon atoms.

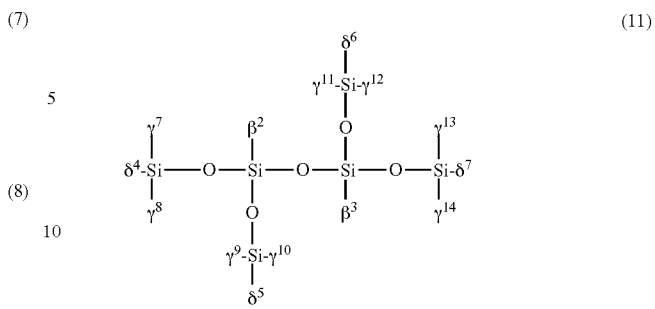
(11)

In the formula (II), each of $\beta^2$ and $\beta^3$ is a vinyl group, an alkyl group having 1 to 6 carbon atoms, a cycloalkyl group having 3 to 6 carbon atoms or an aryl or aralkyl group having 6 to 12 carbon atoms. Each of $\gamma^7$, $\gamma^8$, $\gamma^9$, $\gamma^{10}$, $\gamma^{11}$, $\gamma^{12}$, $\gamma^{13}$ and $\gamma^{14}$ is an alkyl group having 1 to 6 carbon atoms, a cycloalkyl group having 3 to 6 carbon atoms or an aryl or aralkyl group having 6 to 12 carbon atoms, and at least one group is an aryl or aralkyl group. Each of $\delta^4$, $\delta^5$, $\delta^6$ and $\delta^7$ is an alkoxy group having 1 to 4 carbon atoms.

The content of the above component per 100 parts by weight of total of the components A and B is preferably 0.01 to 10 parts by weight, more preferably 0.05 to 5 parts by weight, still more preferably 0.1 to 5 parts by weight.

(4) Halogen-Containing Flame Retardant

As a halogen-containing flame retardant, brominated polycarbonate (including an oligomer) is particularly preferred. A brominated polycarbonate is excellent in heat resistance, and can remarkably improve the flame retardancy. In the brominated polycarbonate for use in this invention, the content of a constituent unit of the following formula (12) based on the total constituent units is at least 60 mol %, preferably at least 80 mol %, and the brominated polycarbonate for use in this invention is particularly preferably a brominated polycarbonate composed substantially of a constituent unit of the following formula (12).

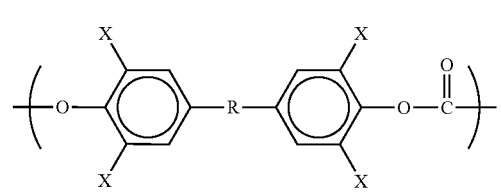
(12)

In the formula (12), X is a bromine atom, and R is an alkylene group having 1 to 4 carbon atoms, an alkylidene group having 1 to 4 carbon atoms or —$SO_2$—.

In the above formula (12), preferably, R is a methylene group, an ethylene group, an isopropylidene group or —$SO_2$—, and particularly preferably an isopropylidene group.

In the brominated polycarbonate, preferably, the content of a residual chloroformate group is small, and the terminal chlorine amount is 0.3 ppm or less, more preferably 0.2 ppm or less. The above terminal chlorine amount can be determined by dissolving a sample in methylene chloride, adding 4-(p-nitrobenzyl)pyridine to react it with terminal chlorine (terminal chloroformate) and measuring it with an ultraviolet visible light spectrophotometer (U-3200 supplied by Hitachi, Ltd.). When the terminal chlorine amount is 0.3 ppm or less, the polycarbonate resin composition is more improved in thermal stability and can be molded at a higher temperature, and as a result, there can be provided a resin composition by far superior in moldability.

In the brominated polycarbonate, preferably, the content of a residual hydroxyl group terminal is small. More specifically, the content of a terminal hydroxyl group per mole of constituent unit of the brominated polycarbonate is preferably 0.0005 mol or less, more preferably 0.0003 mol or less. The content of a terminal hydroxyl group can be determined by dissolving a sample in deutero chloroform and measuring it by a 1H-NMR method. When the terminal hydroxyl group has the above content, preferably, the polycarbonate resin composition is further improved in thermal stability.

The specific viscosity of the brominated polycarbonate is preferably in the range of 0.015 to 0.1, more preferably in the range of 0.015 to 0.08. The specific viscosity of the brominated polycarbonate is calculated according to the above expression for calculating a specific viscosity used for calculating the viscosity average molecular weight of a polycarbonate resin. The content of the above component per 100 parts by weight of total of the components A and B is preferably 0.01 to 10 parts by weight, more preferably 0.01 to 8 parts by weight, still more preferably 0.05 to 7 parts by weight.

(ii) Fluorine-Containing

The resin composition of this invention can contain a fluorine-containing dripping preventer. By using the fluorine-containing dripping preventer in combination with the above flame retardant, far superior flame retardancy can be attained. The fluorine-containing dripping preventer includes a fluorine-containing polymer having capability of forming fibrils, and the polymer includes polytetrafluoroethylene, a tetrafluoroethylene-containing copolymers (such as a tetrafluoroethylene/hexafluoropropylene copolymer), a partially fluorinated polymer disclosed in U.S. Pat. No. 4,379,910, and a polycarbonate resin produced from fluorinated diphenol. Preferred is polytetrafluoroethylene (to be sometimes referred to as "PTFE" hereinafter).

Polytetrafluoroethylene having capability of forming fibrils (fibrillated PTFE) has a remarkably high molecular weight, and PTFEs exhibit the tendency to form fibrous by bonding to each other by the external action such as a shear force. The number average molecular weight thereof is in the range of 1,500,000 to tens of millions. This lower limit is preferably 3,000,000. The above number average molecular weight is calculated on the basis of the melt viscosity of polytetrafluoroethylene at 380° C. as disclosed in JP 6-145520A. That is, the melt viscosity of the fibrillated PTFE measured by the method described in the above JP publication at 380° C. is in the range of 107 to 1,013 poise, preferably in the range of 108 to 1,012 poise.

Further, PTFE can be selected from PTFE in the form of a solid and PTFE in the form of an aqueous dispersion. Further, PTFE having capability of forming fibrils can be also used as a mixture with other resin for improving PTFE in dispersibility in a resin so that far superior flame retardancy and mechanical properties can be attained. As disclosed in JP 6-145520, further, structure composed of such a fibrillated PTFE as a core and low-molecular-weight polytetrafluoroethylene as a shell is also preferably used.

Commercial products of the fibrillated PTFE include, for example, Teflon (registered trademark) 6J of Du Pont-Mitsui Fluorochemicals Co., Ltd. and Polyflon MPA FA500, F201L of Daikin Industries, Ltd. Commercial products of the aqueous dispersion of fibrillated PTFE typically include Fluon AD-1 and AD-936 supplied by Asahi ICI Fluorochemicals Co., Ltd., Fluon D-1 and D-2 supplied by Daikin Industries, Ltd., and Teflon (registered trademark) 30J supplied by Du Pont-Mitsui Fluorochemicals Co., Ltd.

As a fibrillated PTFE in the form of a mixture, there can be used those which are obtained by (1) a method in which an aqueous dispersion of fibrillated PTFE and an aqueous dispersion or solution of an organic polymer are mixed and coprecipitated to obtain a co-aggregated mixture (method described in JP 60-258263A and JP 63-154744A), (2) a method in which an aqueous dispersion of fibrillated PTFE and dry organic polymer particles are mixed (method described in JP 4-272957A), (3) a method in which an aqueous dispersion of fibrillated PTFE and a solution of organic polymer particles are uniformly mixed and media therefor are removed from the mixture at the same time (method described in JP 06-220210A and JP 08-188653A), (4) a method in which a monomer for forming an organic polymer is polymerized in an aqueous dispersion of fibrillated PTFE (method described in JP 9-95583A), and (5) a method in which an aqueous dispersion of fibrillated PTFE and a dispersion of organic polymer particles are uniformly mixed, a vinyl monomer is further polymerized in the dispersion mixture and then a mixture is obtained (method described in JP 11-29679A).

Commercial products of fibrillated PTFE in the form of a mixture include "METABLEN A3800" (trade name) supplied by Mitsubishi Rayon Co., Ltd., "BLENDEX B449" (trade name) supplied by Ciba Specialty Chemicals, and "POLY TS AD001" (trade name) supplied by Pacific Interchem Corporation.

For keeping the mechanical strength of the above fibrillated PTFE as much as possible from decreasing, it is preferred to finely disperse it as much as possible. As means for achieving such a fine dispersion, the fibrillated PTFE in the form of the above mixture is advantageous. Further, the method of directly supplying the fibrillated PTFE in the form of an aqueous dispersion to a melt kneader is also advantageous for a fine dispersion. However, it should be taken into consideration that a fibrillated PTFE in the form of an aqueous dispersion tends to deteriorate the color hue. The content of the fibrillated PTFE in the form of a mixture per 100% by weight of the mixture is preferably 10 to 80% by weight, more preferably 15 to 75% by weight. When the content of the fibrillated PTFE is within the above range, an excellent dispersibility of the fibrillated PTFE can be achieved.

The content of the above component per 100 parts by weight of total of the components A and B is preferably 0.01 to 3 parts by weight, more preferably 0.01 to 2 parts by weight, still more preferably 0.05 to 1.5 parts by weight.

(iii) Stabilizer

The resin composition of this invention may contain various known stabilizers. The stabilizers include a phosphorus-containing stabilizer, a hindered-phenol-containing antioxidant, an ultraviolet absorbent and a light stabilizer.

(iii-1) Phosphorus-Containing Stabilizer

The phosphorus-containing stabilizer includes phosphorous acid, phosphoric acid, phosphonous acid, phosphonic acid, esters of these and tertiary phosphine. Of these, phosphorous acid, phosphoric acid, phosphonous acid, phosphonic acid, a triorganophosphate compound and an acid phosphate compound are in particular preferred. The organic group in the acid phosphate compound includes mono-substitution, di-substitution and a mixture of these. It is to be understood that the following examples corresponding to the above compound similarly include any of these.

The triorganophosphate compound includes trimethyl phosphate, triethyl phosphate, tributyl phosphate, trioctyl phosphate, tridecyl phosphate, tridodecyl phosphate, trilauryl phosphate, tristearyl phosphate, tricresyl phosphate, triphenyl phosphate, trichlorophenyl phosphate, diphenyl cresyl phosphate, diphenyl monooxoxenyl phosphate, and tributoxyethyl phosphate. Of these, trialkyl phosphate is preferred. The number of carbon atoms of the above trialkyl phosphate is preferably 1 to 22, more preferably 1 to 4. The trialkyl phosphate is particularly preferably trimethyl phosphate.

Examples of the acid phosphate compound include methyl acid phosphate, ethyl acid phosphate, butyl acid phosphate, butoxyethyl acid phosphate, octyl acid phosphate, decyl acid phosphate, lauryl acid phosphate, stearyl acid phosphate, oleyl acid phosphate, behenyl acid phosphate, phenyl acid phosphate, nonyl phenyl acid phosphate, cyclohexyl acid phosphate, phenoxyethyl acid phosphate, alkoxypolyethylene glycol acid phosphate and bisphenol A acid phosphate. Of these, long-chain dialkyl acid phosphates having 10 or more carbon atoms are effective for an improvement in thermal stability, and such acid phosphates per se have high stability and are hence preferred.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-iso-propylphenyl) phosphite, tris(di-n-butylphenyl)phosphite, tris(2,4-di-tert-butylphenyl)phosphite, tris(2,6-di-tert-butylphenyl) phosphite, distearylpentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenyl)phenyl}pentaerythritol diphosphite, phenylbisphenol A pentaerythritol diphosphite, bis(nonylphenyl)pentaerythritol diphosphite, and dicyclohexyl pentaerythritol diphosphite.

As other phosphite compound, further, those which react with dihydric phenols and have cyclic structures can be also used. Examples thereof include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite and 2,2-methylenebis(4,6-di-tert-butylphenyl)octyl phosphite.

The phosphonite compound includes tetrakis(2,4-di-tert-butylphenyl)-4,4'-biphenylenediphosphonite, tetrakis(2,4-di-tert-butylphenyl)-4,3'-biphenylenediphosphonite, tetrakis(2,4-di-tert-butylphenyl)-3,3'-biphenylenediphosphonite, tetrakis(2,6-di-tert-butylphenyl)-4,4'-biphenylenediphosphonite, tetrakis(2,6-di-tert-butylphenyl)-4,3'-biphenylenediphosphonite, tetrakis(2,6-di-tert-butylphenyl)-3,3'-biphenylenediphosphonite, bis(2,4-di-tert-butylphenyl)-4-phenylphenylphosphonite, bis(2,4-di-tert-butylphenyl)-3-phenylphenylphosphonite, bis(2,6-di-n-butylphenyl)-3-phenylphenylphosphonite, bis(2,6-di-tert-butylphenyl)-4-phenylphenylphosphonite, and bis(2,6-di-tert-butylphenyl)-3-phenyl-phenylphosphonite. Tetrakis(di-tert-butylpheyl)-biphenylenediphosphonite and bis(di-tert-butylphenyl)-phenyl-phenylphosphonite are preferred, and tetrakis(2,4-di-tert-butylphenyl)-biphenylenediphosphonite and bis(2,4-di-tert-butylphenyl)-phenyl-phenylphosphonite are more preferred. The above phosphonite compound is preferred since it can be used in combination with a phosphite compound having an aryl group on which the two or more of the above alkyl groups are substituted.

The phosphonate compound includes dimethyl benzenephosphonate, diethyl benzenephosphonate and dipropyl benzenephosphonate.

Examples of the tertiary phosphine include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine and diphenylbenzylphosphine. The tertiary phosphine is particularly preferably triphenylphosphine.

The phosphorus-containing stabilizer is preferably selected from the trioroganophosphate compounds, the acid phosphate compounds and phosphite compounds of the following formula (13). In particular, it is preferred to incorporate a triorganophosphate compound.

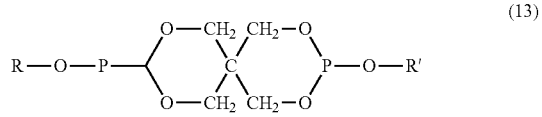

(13)

In the formula (13), each of R and R' is an alkyl group having 6 to 30 carbon atoms or an aryl group having 6 to 30 carbon atoms, and each may be the same as, or may be different from, the other.

As described above, the phosphonite compound is preferably tetrakis(2,4-di-tert-butylphenyl)-biphenylenediphosphonite, and stabilizers composed of the above phosphonite as a main component are commercially sold and available as Sandstab P-EPQ (trade name, supplied by Clariant Corporation) and Irgafos P-EPQ (trade name, supplied by Ciba Specialty Chemicals).

Of the compounds of the formula (13), distearylpentaerythritoldiphosphite, bis(2,4-di-tert-butylphenl)pentaerythritoldiphosphite, bis(2,6-di-tert-butyl-4-methylphenl)pentaerythritoldiphosphite and bis{2,4-bis(1-methyl-1-phenylethyl)phenyl}pentaerythritoldiphosphite are more preferred.

(iii-2) Hindered-Phenol-Containing Antioxidant

The hindered phenol compound can be selected from various compounds that are normally incorporated into resins. Examples of the hindered phenol compound include α-tocopherol, butylhydroxytoluene, sinapyl alcohol, vitamin E, octadecyl-3-(3,5-di-tert-butyl-4-hydroxyphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexandediolbis[3-(3,5-di-tert-butyl-4-hydroxyphenyl)propionate, bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tertbutylphenol), 4,4'-tri-thiobis(2,6-di-tert-butylphenol), 2,2'-thiodiethylenebis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris-2-[3-(3,5-di-tert-butyl-4-hydroxyphenyl)propionyloxy]ethyl isocyanurate, tetrakis[methylene-3-(3,5-di-tert-butyl-4-hydroxyphenyl)propionate]methane, triethylene glycol-N-bis-3-(3-tert-butyl-4-hydroxy-5-methylphenyl)propionate, triethylene glycol-N-bis-3-(3-tert-butyl-4-hydroxy-5-methylphenyl)acetate, 3,9-bis[2-{3-(3-tert-butyl-4-hydroxy-5-methylphenyl)acetyloxy}-1,1-dimethylethyl]-2,4,8,10-tetraoxaspiro[5,5]undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzyl)benzene, and tris(3-di-tert-butyl-4-hydroxy-5-methylbenzyl)isocyanurate.

Of the above compounds, tetrakis[methylene-3-(3-tert-butyl-4-hydroxy-5-methylphenyl)propionate]methane, octadecyl-3-(3,5-di-tert-butyl-4-hydroxyphenyl)propionate and 3,9-bis[2-{3-(3-tert-butyl-4-hydroxy-5-methylphenyl)propionyloxy}-1,1-dimethylethyl]-2,4,8,10-tetraoxaspiro[5,5]undecane are preferably used in this invention. In particular, 3,9-bis[2-{3-(3-tert-butyl-4-hydroxy-5-methylphenyl)propionyloxy}-1,1-dimethylethyl]-2,4,8,10-tetraoxaspiro[5,5]undecane is preferred. The above hindered-phenol-containing antioxidants can be used singly or in combination of the two or more of them.

It is preferred to incorporate either one of the phosphorus-containing stabilizer and the hindered-phenol-containing antioxidant. In particular, it is preferred to incorporate the phosphorus-containing stabilizer, and it is more preferred to incorporate the triorganophosphate compound. The content of each of the phosphorus-containing stabilizer and the hindered-phenol-containing antioxidant per 100 parts by weight of total of the components A and B is preferably 0.005 to 1 part by weight, more preferably 0.01 to 0.3 part by weight.

(iii-3) Ultraviolet Absorbent

The resin composition of this invention may contain an ultraviolet absorbent. Having an excellent color hue, the resin composition of this invention can maintain such a color hue even in outdoor use for a long time by incorporating the ultraviolet absorbent.

Examples of the benzophenone-containing ultraviolet absorbent include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrideratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Examples of the benzotriazole-containing ultraviolet absorbent include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tret-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzooxazin-4-one), 2-[2-hydroxy-3-(3,4,5,6-tetrahydrophthalimidomethyl)-5-methylphenyl]benzotriazole, and polymers having 2-hydroxyphenyl-2H-benzotrizaole skeleton such as a copolymer of 2-(2'-hydroxy-5-methacryloxyethylphenyl)-2H-benzotriazole with a vinyl monomer copolymerizable with this monomer and a copolymer of 2-(2'-hydorxy-5-acryloxyethylphenyl)-2H-benzotriazole with a vinyl monomer copolymerizable with this monomer.

Examples of the hydroxyphenyl-triazine-containing ultraviolet absorbent includes 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Further, they also include compounds formed by replacing the phenyl group of the above exemplified compounds with 2,4-dimethylphenyl such as 2-(4,6-bis(2,4-dimethylphenyl)-1,3,5-triazin-2-yl)-5-hexyloxyphenol, etc.

Examples of the cycloiminoester-containing ultraviolet absorbent include 2,2'-p-phenylenebis(3,1-benzooxazin-4-one), 2,2'-(4,4'-diphenylene)bis(3,1-benzooxazin-4-one) and 2,2'-(2,6-naphthalene)bis(3,1-benzooxazin-4-one).

Examples of the cyanoacrylate-containing ultraviolet absorbent include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

Further, the ultraviolet absorbent may ultraviolet absorbent having the structure of a radical-polymerizable monomer compound, therefore it may be of a polymer-type ultraviolet absorbent obtained by copolymerizing this ultraviolet absorbent monomer and/or light-stabilizing monomer having a hindered amine structure with a monomer such as alkyl (meth)acrylate. The above ultraviolet absorbent monomer suitably includes compounds having a benzotriazole skeleton, a benzophenone skeleton, a triazine skeleton, a cycloiminoester skeleton and a cyanoacrylate skeleton in ester substituents of (meth)acrylic esters.

Of the above ultraviolet absorbents, the benzotriazole-containing and hydroxyphenyl-triazine-containing ultraviolet absorbents are preferred in respect of ultraviolet absorbing capability. The cycloiminoester-containing and cyanoacrylate-containing ultraviolet absorbents are preferred in respect of heat resistance and color hue. The above ultraviolet absorbents may be used singly or as a mixture of the two or more of them.

The content of the ultraviolet absorbent per 100 parts by weight of total of the components A and B is 0.01 to 2 parts by weight, more preferably 0.02 to 2 parts by weight, still more preferably 0.03 to 1 part by weight, the most preferably 0.05 to 0.5 part by weight.

(iii-4) Other Thermal Stabilizer

The resin composition of this invention may contain other stabilizer different from the above phosphorus-containing stabilizer and hindered-phenol-containing antioxidant. The other thermal stabilizer is preferably used in combination with either one of the stabilizer and the antioxidant, and particularly preferably used in combination of both of them. Examples of the other thermal stabilizer preferably include a lactone-containing stabilizer typified by a reaction product of 3-hydroxy-5,7-di-tert-butyl-furan-2-one and o-xylene (this stabilizer is described in detail in JP 7-233160 A). This compound is commercially sold as Irganox HP-136 (trade name, supplied by Ciba Specialty Chemicals) and is available. Further, stabilizers obtained by mixing the above compound with various phosphite compounds and hindered phenol compounds are commercially available. For example, Irganox HP-2921 supplied by the above Company is a suitable example. This invention can use the above pre-mixed stabilizer. The content of the lactone-containing stabilizer per 100 parts by weight of total of the components A and B is 0.0005 to 0.05 part by weight, more preferably 0.001 to 0.03 part by weight.

Examples of the other stabilizer also include sulfur-containing stabilizers such as pentaerythritoltetrakis(3-mercaptopropionate), pentaerythritoltetrakis(3-laurylthiopropionate) and glycerol-3-stearylthiopropionate. The above stabilizer is in particular effective when the resin composition of this invention is used in rotational molding. The content of the above sulfur-containing stabilizer per 100 parts by weight of total of the components A and B is 0.001 to 0.1 part by weight, more preferably 0.01 to 0.08 part by weight.

(iv) Mold Release Agent

The resin composition of this invention may further contain known mold release agents such as fatty acid ester, polyolefin-based wax, a silicone compound, a fluorine compound (fluorine oil typified by polyfluoroalkyl ether), paraffin wax and beeswax for the purpose of improving productivity during molding and improving the dimensional accuracy of molded articles. Having excellent flowability, the resin composition of this invention is excellent in pressure propagation and gives molded articles having a distorsion rendered uniform. On the other hand, when it is a molded article having a complicated form that increases a resistance against release from a mold, the mold article may be deformed when it is released from a mold. The incorporation of the above specific components will solve such a problem without impairing the properties of the resin composition.

The above fatty acid ester is an ester of an aliphatic alcohol and an aliphatic carboxylic acid. The aliphatic alcohol may be a monohydric alcohol or a dihydric alcohol or higher polyhydric alcohol. The above alcohol preferably has 3 to 32 carbon atoms, more preferably 5 to 30 carbon atoms. On the other hand, the aliphatic carboxylic acid is an aliphatic carboxylic acid preferably having 3 to 32 carbon atoms, more preferably 10 to 30 carbon atoms. Of these, a saturated aliphatic carboxylic acid is preferred. As a fatty acid ester, a whole ester (full ester) is preferred in that it is excellent in thermal stability at high temperatures. The acid value of the fatty acid ester is preferably 20 or less (which can be substantially 0). The hydroxyl value of the fatty acid ester is more preferably in the range of 0.1 to 30. Further, the iodine value of the fatty acid ester is preferably 10 or less (which can be substantially 0). These properties can be determined by methods specified in JIS K 0070.

Examples of the polyolefin-based wax include those which have a molecular weight of 1,000 to 10,000, such as an ethylene homopolymer, a homopolymer or copolymer of an α-olefin having 3 to 60 carbon atoms, and a copolymer of ethylene and an α-olefin having 3 to 60 carbon atoms. The above molecular weight is a number average molecular weight measured as a standard polystyrene by a GPC (gel permeation chromatography) method. The upper limit of the above number average molecular weight is preferably 6,000, more preferably 3,000. The number of carbon atoms of the α-olefin component of the polyolefin-based wax is preferably 60 or less, more preferably 40 or less. Specific examples thereof preferably include propylene, 1-butene, 1-hexene, 4-methyl-1-pentene and 1-octene. The polyolefin-based wax is preferably an ethylene homopolymer and a copolymer of ethylene and an α-olefin having 3 to 60 carbon atoms. The amount ratio of the α-olefin having 3 to 60 carbon atoms is preferably 20 mol % or less, more preferably 10 mol % or less. A so-called commercially available polyethylene wax can be preferably used.

The content of the mold release agent per 100 parts by weight of total of the components A and B is preferably 0.005 to 5 parts by weight, more preferably 0.01 to 4 parts by weight, still more preferably 0.02 to 3 parts by weight.

(v) Dyes and Pigments

The resin composition of this invention contains various dyes and pigments and can provide molded articles that exhibit a variety of designs. The dyes and pigments for use in this invention include a perylene-containing dye, a coumarin-containing dye, a thioindigo-containing dye, an anthraquinone-containing dye, a thioxanthone-containing dye, ferrocyanide compounds such as an ultramarine blue pigment, a perinone-containing dye, a quinoline-containing dye, a quinacridone-containing dye, a dioxazine-containing dye, an isoindolinone-containing dye and a phthalocyanine-containing dye.

The resin composition of this invention can provide an excellent metallic color by containing a metallic pigment. The metallic pigment is preferably an aluminum powder. Further, the incorporation of a fluorescent brightener or other light-emitting fluorescent dye can further impart a molded article with an excellent design effect produced by the use of a luminescent color.

Examples of the fluorescent dyes (including fluorescent brighteners) for use in this invention include a coumarin-containing fluorescent dye, a benzopyran-containing fluorescent dye, a perylene-containing fluorescent dye, an anthraquinone-containing fluorescent dye, a thioindigo-containing fluorescent dye, a xanthene-containing fluorescent dye, a xanthone-containing fluorescent dye, a thioxanthene-containing fluorescent dye, a thioxanthone-containing fluorescent dye, a thiazine-containing fluorescent dye and a diaminostilbene-containing fluorescent dye. Of these, a coumarin-containing fluorescent dye, a benzopyran-containing fluorescent dye and a perylene-containing fluorescent dye which are excellent in heat resistance and less susceptible to deterioration during the molding of a polycarbonate resin are preferred.

The content of the above dye and pigment per 100 parts by weight of total of the components A and B is preferably 0.00001 to 1 part by weight, more preferably 0.00005 to 0.5 part by weight.

(vi) Compound Capable of Absorbing Heat

The resin composition of this invention can contain a compound capable of absorbing heat. Examples of the above compound include phthalocyanine-containing near infrared absorbents, various metal oxides excellent in heat-absorbing capability including metal-oxide-containing near infrared absorbents such as ATO, ITO, iridium oxide and ruthenium oxide and innonium oxide, metal-boride-containing near infrared absorbents such as lanthanum boride cerium boride and tungsten boride and a tungsten-oxide-containing near infrared absorbent, and carbon filler. As the above phthalocyanine-containing near infrared absorbent, for example, MIR-362 supplied by Mitsui Chemical Corporation is commercially easily available. Examples of the carbon filler include carbon black, graphite (including both natural and synthetic ones) and fullerene. Carbon black and graphite are preferred. These may be used singly or in combination of the two or more of them. The content of the phthalocyanine-containing near infrared absorbent per 100 parts by weight of total of the components A and B is preferably 0.0005 to 0.2 part by weight, more preferably 0.0008 to 0.1 part by weight, still more preferably 0.001 to 0.07 part by weight. The content of any one of the metal-oxide-containing near infrared absorbent, the metal-boride-containing near infrared absorbent and the carbon filler in the resin composition of this invention is preferably in the range of 0.1 to 200 ppm (weight ratio), more preferably in the range of 0.5 to 100 ppm.

(vii) Light Diffusing Agent

The resin composition of this invention can contain a light diffusing agent to impart a molded article with a light diffusing effect. The above light diffusing agent includes, for example, low-refractivity inorganic fine particles such as polymer fine particles and calcium carbonate and a composite product thereof. Such polymer fine particles are already known as a light diffusing agent for a polycarbonate resin. More suitably, it includes, for example, acryl crosslinked particles having a diameter of several μm and silicone crosslinked particles typified by polyorganosesquioxane. The light diffusing agent has the form, for example, of spheres, discs, columns or being infinite. The form of the above spheres is not required to be the form of complete spheres and include deformed spheres. The form of columns include the form of cubes. The light diffusing agent preferably has the form of spheres, and as the diameters of the particles become more uniform, the particles are more preferred. The content of the light diffusing agent per 100 parts by weight of total of the components A and B is preferably 0.005 to 20 parts by weight, more preferably 0.01 to 10 parts by weight, still more preferably 0.01 to 3 parts by weight. The two or more of the light diffusing agents can be used in combination.

(viii) White Pigment for High Reflection

The resin composition of this invention can contain a white pigment for high reflection in order to impart a molded article with a reflection effect. The above white pigment is particularly preferably a titanium dioxide pigment (in particular, titanium dioxide surface-treated with an organic surface treating agent such as silicone). The content of the above white pigment for high reflection per 100 parts by weight of total of the components A and B is preferably 3 to 30 parts by weight, more preferably 8 to 25 parts by weight. The two or more of white pigments for high reflection can be used in combination.

(ix) Antistatic Agent

The resin composition of this invention is sometimes required to have antistatic performances, and in such a case, it preferably contains an antistatic agent. Examples of the antistatic agent include (1) arylsulfonic acid phosphonium salts typified by dodecylbenzenesulfonic acid phosphonium salt, organic sulfonic acid phosphonium salts such as alkylsulfonic acid phosphonium salt and boric acid phosphonium salts such as tetrafuloroboric acid phosphonium salt. The content of the phosphonium salt per 100 parts by weight of total of the components A and B is properly 5 parts by weight or less, preferably 0.05 to 5 parts by weight more preferably 1 to 3.5 parts by weight, much more preferably in the range of 1.5 to 3 parts by weight.

Examples of the antistatic agent include (2) organic sulfonic acid alkali (alkaline earth) metal salts such as organic lithium sulfonate, organic sodium sulfonate, organic potassium sulfonate, organic cesium sulfonate, organic rubidium sulfonate, organic calcium sulfonate, organic magnesium sulfonate and organic barium sulfonate. These metal salts are also used as flame retardants as described already. More specifically, these metal salts include metal salts of dodecylbenzenesulfonic acid and metal salts of perfluoroalkanesulfonic acid. The content of the organic sulfonic acid alkali (alkaline earth) metal salt per 100 parts by weight of total of the components A and B is properly 0.5 part by weight or less, preferably 0.001 to 3 part by weight, more preferably 0.005 to 0.2 part by weight. In particular, salts of alkali metals such as potassium, cesium and rubidium are preferred.

Examples of the antistatic agent include (3) organic sulfonic acid ammonium salts such as alkylsulfonic acid ammonium salt and arylsulfonic acid ammonium salt. The content of the above ammonium salt per 100 parts by weight of total of the components A and B is properly 0.05 part by weight or less. Examples of the antistatic agent include (4) a polymer containing, as a constituent component, a poly(oxyalkylene) glycol component such as polyetheramide. The content of the above polymer per 100 parts by weight of total of the components A and B is properly 5 parts by weight or less.

(x) Filler

The resin composition of this invention can contain various fillers that are known as reinforcement fillers. The filler can be selected from various fibrous fillers, plate-shaped fillers and particulate fillers. The above fibrous filler refers to a filler having the form of fibers (including rods, needles, flat forms or forms of which the axes extend in a plurality of directions). The plate-shaped filler refers to a filler having the form of a plate (including a plate having concave and convex shapes on the surface and a plate having a curved form). The particulate filler including a filler having an indefinite form refers to a filler having forms other than the above forms.

The forms of the above fibrous filler and plate-shaped filler are clear in many cases by observing their forms, and as for differences from a so-called indefinite form, those which have an aspect ratio of 3 or more can be said to have the form of fibers or a plate.

Examples of the filler having the form of a plate preferably include glass flakes, talc, mica, kaolin, metal flakes, carbon flakes, graphite, and plate-shaped fillers obtained by surface-coating these fillers with a different material such as a metal or metal oxide. The particle diameter thereof is preferably in the range of 0.1 to 300 μm. The above particle diameter refers to a median diameter (D50) of a particle diameter distribution measured by an X-ray inspection method that is one of liquid phase precipitation methods when it is in the range of up to approximately 10 μm. It refers to a median diameter (D50) of a particle diameter distribution measured a laser diffraction-scattering method when it is in the range of 10 to 50 μm. It refers to a value according to a vibration-applied screen classification method when it is in the range of 50 to 300 μm. The above particle diameter refers to a particle diameter in a resin composition.

The plate-shaped filler may be surface-treated with coupling agents such as various silane-, titanate-, aluminate- and zirconate-containing coupling agents. Further, it may be a granulated product that is treated for sizing or binding it with various resins such as an olefin resin, a styrene resin, an acrylic resin, a polyester resin, an epoxy resin and an urethane resin or a higher fatty acid ester or that is compressed.

The fibrous filler preferably has a fiber diameter in the range of 0.1 to 20 μm. The upper limit of the fiber diameter is preferably 13 μm, more preferably 10 μm. The lower limit of the fiber diameter is preferably 1 μm. The above fiber diameter refers to a number average fiber diameter. This number average fiber diameter refers to a value calculated from an image obtained by scanning electron microscope observation of a residue collected after dissolving a molded article in a solvent or decomposing a resin with a basic compound and an ashed residue collected after ashing a resin in a crucible.

Examples of the fibrous filler include fibrous inorganic fillers such as a glass fiber, a cross-sectionally flat glass fiber, a glass milled fiber, glass flakes, a carbon fiber, a cross-sectionally flat carbon fiber, a carbon milled fiber, a metal fiber, a basalt fiber, asbestos, rock wool, a ceramic fiber, a slug fiber, potassium titanate whisker, boron whisker, aluminum borate whisker, calcium carbonate whisker, titanium oxide whisker, wollastonite, xonotlite, palygorskite (attapulgite) and sepiolite. Further, examples thereof also include fibrous heat-resistant organic fillers typified by heat-resistant organic fibers such as an aramid fiber, a polyimide fiber and a polybenzthiazole fiber, plant fibers such as hemp and bamboo, and fibrous fillers obtained by surface-coating these fillers with a different material such as metal and meal oxide.

Examples of the fillers that are surface-coated with a different material include a metal-coated glass fiber, metal-coated glass flakes, titanium-oxide-coated glass flakes and a metal-coated carbon fiber. The method of surface-coating with a different material is not specially limited, and examples thereof include known various plating methods (e.g., electrolytic plating, electroless plating and hot-dip plating), a vacuum vapor deposition method, an ion plating method, CVD methods (e.g., thermal CVD, MOCVD and plasma CVD), a PVD method and a sputtering method.

The above fibrous filler refers to a fibrous filler of which the aspect ratio is 3 or more, preferably 5 or more, more preferably 10 or more. The upper limit of the aspect ratio is approximately 10,000, preferably 200. The above aspect ratio of the filler is a value in a resin composition. Further, the cross-sectionally flat glass fiber refers to a glass fiber having a cross section having a major diameter average value of 10 to 50 µm, preferably 15 to 40 µm, more preferably 20 to 35 µm and having a major diameter/miner diameter ratio (major diameter/miner diameter) average value of from 1.5 to 8, preferably from 2 to 6, more preferably from 2.5 to 5. The fibrous filler may be surface-treated with various coupling agents like the above plate-shaped filler, and it may be also granulated by sizing or binding treatment with various resins and compression treatment.

The content of the above filler per 100 parts by weight of total of the components A and B is preferably 200 parts by weight or less, more preferably 100 parts by weight or less, still more preferably 50 parts by weight or less, particularly preferably 30 parts by weight or less.

(xi) Other Additives

The resin composition of this invention may contain thermoplastic resins other than the components A and B, an elastomer, other flowability improving agent, an anti-fungus agent, a dispersing agent such as liquid paraffin, a photocatalytic stain-proofing agent and a photochromic agent.

Examples of the above "other" resin include resins such as a polyamide resin, a polyimide resin, a polyetherimide resin, a polyurethane resin, a silicone resin, a polyphenylene ether resin, a polyphenylene sulfide resin, a polysulfone resin, polyolefin resins such as polyethylene and polypropylene, a polystyrene resin, an acrylonitrile/styrene copolymer (AS resin), an acrylonitrile/butadiene/styrene copolymer (ABS resin), a polymethacrylate resin, a phenolic resin, an epoxy resin, a cyclic polyolefin resin, a polylactic acid resin, a polycaprolactone resin, and thermoplastic fluorine resins (typified by a vinylidene fluoride resin).

Examples of the elastomer isobutylene/isoprene rubber, styrene/butadiene rubber, ethylene/propylene rubber, an acryl-containing elastomer, a polyester-containing elastomer, a polyamide-containing elastomer, MBS (methyl methacrylate/styrene/butadiene) rubber that is a core-shell type elastomer and MAS (methyl methacrylate/acrylonitrile/styrene) rubber.

The content of the above "other" thermoplastic resin per 100 parts by weight of total of the components A and B is preferably 30 parts by weight or less, more preferably 20 parts by weight or less.

(Production of Resin Composition)

For producing the resin composition of this invention, any method can be employed. For example, there is employed a method in which the component A, the component B and arbitrary other components are pre-mixed, then melt-kneaded and pelletized.

The means for pre-mixing include a Nauta-mixer, a V-blender, a Henschel mixer, a mechano-chemical apparatus and an extrusion mixing machine. In the pre-mixing, the mixture may be granulated with an extrusion granulator or briquetting machine as required. When the component A is in the form of a powder, for example, there is employed other method in which part of the powder and additives to be incorporated are blended to prepare a master batch of the additives diluted with the powder, and such a master batch is used. After the pre-mixing, the mixture is melt-kneaded with a melt-kneader typified by a vented twin-screw extruder and pelletized with a machine such as a pelletizer. The melt-kneader also includes a Banbury mixer, a kneading roll and a constant heat stirring vessel, while a vented twin-screw extruder is preferred.

In addition, there may be also employed a method in which each component is independently supplied to a melt-kneading machine typified by a twin-screw extruder without being pre-mixed. Further, there is also employed a method in which part of each component is pre-mixed and then supplied to a melt-kneading machine independently of the remaining components. In particular, when an inorganic filler is incorporated, preferably, the inorganic filler is supplied into a molten resin from feed port in some middle point of an extruder with a supply apparatus such as a side feeder. The pre-mixing means and granulation are as described above. When a component in the form of a liquid is incorporated, a so-called liquid-injection apparatus or liquid-adding apparatus can be used for supplying it to a melt kneader.

The extruder is preferably selected from those which have a vent capable of removing water in raw materials and volatile gas generated from a molten kneaded resin. A vacuum pump is preferably provided for efficiently discharging generated water and volatile gas out of the extruder. A foreign matter included in the raw materials to be extruded can be removed from the resin composition by providing a screen for removing such a foreign matter in a zone before the die portion of an extruder. The above screen includes metal gauze, a screen changer and a sintered metal plate (disc filter).

The melt-kneader includes a twin-screw extruder, and besides this, includes a Banbury mixer, a kneading roll, a single-screw extruder and a multi-screw extruder having three or more screws.

Further, preferably, the content of water in the components A and B is small before their kneading. It is hence preferred to dry the component A or the component B or both by a hot air drying, electromagnetic drying or vacuum drying method and then melt-knead them. The suction degree of a vent during the melt-kneading is in the range of 1 to 60 kPa, preferably 2 to 30 kPa.

The thus-extruded resin is pelletized by directly cutting it or pelletized by forming strands and then cutting the strands with a pelletizer. When it is required to decrease the influence of external dust, etc., in the pelletization, it is preferred to clean an atmosphere around an extruder. In the production of the above pellets, by various methods proposed with regard to a polycarbonate resin for optical discs, the form distribution of the pellets can be narrowed, the cutting error can be decreased, a fine powder caused in transit or during transportation can be decreased, and air bubbles (vacuum bubbles) generated inside strands or pellets can be decreased, as required. By these methods, the molding cycle time can be decreased and the rate of failures such as silvering can be decreased. The pellets can be in general forms such as cylindrical, prismatic, spherical, and more preferably have the form of cylinders. The diameter of the cylinder is preferably 1 to 5 mm, more preferably 1.5 to 4 mm, still more preferably 2 to 3.3 mm. The length of the cylinder is preferably 1 to 30 mm, more preferably 2 to 5 mm, still more preferably 2.5 to 3.5 mm.

(Molded Article)

Various products can be produced from the resin composition of this invention by injection-molding the above-produced pellets to obtain molded articles. The above injection-molding not only includes a normal molding method but also includes injection compression molding, injection press molding, gas assisted injection molding, expansion molding (including a method of injecting supercritical fluid), insert molding, in-mold coating molding, heat-insulated molding, rapid heating and cooling molding, two-color molding, multiple color molding, sandwich molding and ultrahigh speed injection molding methods. For molding, any one of a cold runner method and a hot runner method can be selected.

Further, the resin composition of this invention can be used in the form of various contour extrusion products, sheets and films by extrusion molding. For forming sheets and films, an inflation method, a calendering method and a casting method can be used. Further, the resin composition can be molded into heat-shrinkable tubes by applying a specific stretching operation. The resin composition of this invention can be subjected to rotational molding or blow molding to obtain molded articles.

In the above manner, there can be provided a resin composition and a molded article having mechanical strength, chemical resistance and thermal stability as well as excellent moist heat resistance. That is, according to this invention, there is provided a molded article obtained by melt-molding a resin composition which contains 50 to 99 parts by weight of the aromatic polycarbonate resin (component A) and 1 to 50 parts by weight of the polyester resin (component B), the component B being a polyester resin polymerized in the presence of a titanium-phosphorus catalyst obtained by a reaction between the titanium compound of the above formula (I) or a titanium compound obtained by reacting the above titanium compound (I) with the aromatic polyhydric carboxylic acid of the above formula (II) or an anhydride thereof and the phosphorus compound of the above formula (III).

Molded articles using the resin composition of this invention are useful in the fields of various electronic and electric machines parts, camera parts, OA machines equipment, precision machine parts, machine parts, vehicle parts, in particular interior and exterior trim parts for vehicles and others such as agricultural materials, transport containers, game devices and miscellaneous goods. The interior and exterior trim parts for vehicles include a steering wheel, a pillar cover and a frame.

The molded article formed of the resin composition of this invention can be subjected to various surface treatments. These surface treatments refer to vapor deposition (physical vapor deposition and chemical vapor deposition), plating (electric plating, electroless plating and hot-dip plating), coating and printing, which are used for forming a new layer on the surface layer of a resin molded article and generally used methods for polycarbonate resin can be applied. Examples of the surface treatments specifically include various surface treatments such as hard coating, water-repellency/oil-repellency coating, ultraviolet absorbent coating, infrared absorbent coating and metallizing (vapor deposition). Hard coating is particularly preferred and required surface treatment.

In addition, the resin composition of this invention has improved adhesion to metal, so that it is preferred to apply vapor deposition treatment and plating treatment thereto. A molded article provided with a metal layer in this manner can be applied to an electromagnetic wave shielding part, a conductive part and an antenna part. These parts are in particular preferred in the form of a sheet or a film.

EXAMPLES

This invention will be explained with reference to Examples. This invention shall not be limited to these Examples.

(I) Evaluation of Resin Composition (i) Ti Elemental Analysis:

Measurements were made with a mass spectroscope Agilent 7500 cs supplied by Agilent Technologies Japan, Ltd. Sulfuric acid was added to a weighed sample resin and the resin was asked by microwave decomposition, and then nitric acid was further added and microwave decomposition was carried out. The resultant metal residue was diluted with ultrapure water to obtain a constant value, and a Ti element amount was measured from the residue.

(ii) Charpy Impact Strength Measurement

Pellets obtained were dried at 120° C. for 5 hours and then molded with an injection-molding machine (SG-150U, supplied by Sumitomo Heavy Industries, Ltd.) at a cylinder temperature of 280° C. and a mold temperature of 70° C. to form a molded piece, and it was measured for a notched Charpy impact strength according to ISO 179.

(iii) MVR Measurement

Pellets obtained were dried at 120° C. for 5 hours and then molded into 2 mm thick test pieces with an injection-molding machine (SG-150U, supplied by Sumitomo Heavy Industries, Ltd.) at a cylinder temperature of 270° C. and a mold temperature of 70° C. and a molding cycle of 50 seconds. One of the test pieces was left in a constant-temperature constant-humidity tester having a temperature of 80° C. and a relative humidity of 95% for 500 hours and then left in an environment at a temperature of 23° C. at a relative humidity of 50% for 24 hours. The test piece after moist heat treatment was measured for an MVR value under the conditions of a temperature of 280° C. and a load of 2.16 kg (21.18 N) according to ISO1133. Another test piece was left in an environment at a temperature of 23° C. at a relative humidity of 50% for 24 hours. The test piece before moist heat treatment was measured for an MVR value under the same conditions. A change ratio ($\Delta$MVR) between the MVR before the moist heat treatment and the MVR after the moist heat treatment was calculated according to the following expression. It means that with an increase in the $\Delta$MVR, the degree of resin deterioration of a molded article is greater. The $\Delta$MVR is preferably 350 or less, more preferably 300 or less.

$$\Delta\text{MVR}=100\times(\text{MVR of test piece after moist heat treatment})/(\text{MVR of test piece before moist heat treatment})$$

(iv) Appearance of Molded Article:

Pellets obtained were dried at 120° C. for 5 hours and then molded into a plate molded article having a length of 150 mm, a width of 150 mm and a thickness of 2 mm with an injection-molding machine (SG-150U, supplied by Sumitomo Heavy Industries, Ltd.) at a cylinder temperature of 280° C. and a mold temperature of 70° C., and the appearance of the plate molded article was evaluated by visually observing it. The evaluation was made on the basis of the following standards. It was evaluated that the results of ○ and Δ stand for being usable.

○: No failure is observed.

Δ: Silvering is observed only in gate portion.

X: Silvering is observed all over the molded article.

(v) Heat Resistance

A deflection temperature under load was measured according to ISO 75-1 and 75-2. The measurement was carried out under a load of 1.80 MPa. A test piece was molded with an injection-molding machine (SG-150U, supplied by Sumitomo Heavy Industries, Ltd.) at a cylinder temperature of 280° C. and a mold temperature of 70° C. The heat resistance is required to be 90° C. or higher.

(vi) Chemical Resistance:

Pellets obtained were dried at 120° C. for 5 hours and then molded into a plate molded article having a length of 150 mm, a width of 150 mm and a thickness of 2 mm with an injection-molding machine (SG-150U, supplied by Sumitomo Heavy Industries, Ltd.) at a cylinder temperature of 280° C. and a mold temperature of 70° C. Commercially available regular gasoline was applied to the plate molded article in an environment having a temperature of 23° C. and a relative humidity of 50% for 1 minute, and the appearance of the plate molded article was evaluated by visually observing it. The evaluation was made on the basis of the following standards.

○: No failure is observed.

X: Silvering is observed all over the molded article.

Examples 1-18 and Comparative Examples 1-12

An aromatic polycarbonate resin, a polyester resin and various additives shown in Tables 1 to 4 in amounts shown in Tables 1 to 4 were blended with a blender, and the blend was melt-kneaded with a vented twin-screw extruder to give pellets. The various additives used were prepared as preliminary mixtures with the polycarbonate resin beforehand such that the preliminary mixtures were to have additive concentrations 10 to 100 times, and they were blended with the rest of all with the blender. A vented twin-screw extruder (TEX30α, supplied by Japan Steel Works, Ltd. (complete intermesh, rotation in the same direction, double-threaded screws)) was used. Extrusion conditions were an output of 20 kg/h, a screw speed of 150 rpm and a vent vacuum degree of 3 kPa, and the extrusion temperature at a first feed port to a die portion was set at 270° C. The thus-obtained pellets were dried at 120° C. for 5 hours with a hot air circulating dryer, and then molded into test pieces for evaluations with the injection-molding machine.

Components indicated by symbols in Tables 1 to 4 are as follows. Resin compositions in Examples 3 to 17 were molded into automobile steering wheels. Further, each of resin compositions in Examples 1 to 17 to be used for a second layer of a two-color molded article that was to be glazed, so that PC pellets and thermoplastic resin pellets in Examples 1-17 which were respectively dried at 110° C. for 5 hours were molded with a large molding machine having a four-screw parallel control mechanism (M1600NS-DM, supplied by MEIKI CO., LTD. maximum clamping force 15,700 kN). It was found that the thus-obtained two-color resin molded articles exhibited excellent mechanical strength and moist heat resistance.

(Component A)

PC-1: A linear aromatic polycarbonate resin powder having a viscosity average molecular weight of 16,000.

PC-2: A linear aromatic polycarbonate resin powder having a viscosity average molecular weight of 25,000.

(Component B)

PET-2:

While a solution prepared by dissolving monolauryl phosphate in ethylene glycol heated to 100° C. was stirred, a liquid mixture of ethylene glycol containing titanium tetrabutoxide with acetic acid was moderately added, and a reaction between a titanium compound and a phosphorus compound was completed to produce a catalyst.

An ester oligomer was generated from ethylene glycol and terephthalic acid oligomer by a general method, and then placed in a polycondensing reaction vessel together with the catalyst to carry out a polycondensing reaction. The degree of progress of the polycondensation was checked by monitoring a load on a stirring blade in the reaction system, and when a desired polymerization degree was attained, the reaction was terminated. Then, the reaction mixture in the system was continuously extruded in the form of a strand from a discharge portion, cooled to solidness and cut to prepare particulate polyethylene terephthalate pellets having a particle diameter of approximately 3 mm (IV=0.53, remaining Ti amount 23 ppm).

PET-1:

PET-2 was semi-crystallized with a high-speed stirring fluid type crystallizer, crystallized under nitrogen current and dried, and it was subjected to solid polycondensation under nitrogen current in a packed solid phase polymerization column. The reaction time was adjusted to give PET-1 (IV=0.83, remaining Ti amount 44 ppm).

PET-3 (for comparison): Polyethylene terephthalate resin (IV=0.80) obtained by polymerization in the presence of an acetyltriisopropyl titanate polymerization catalyst.

PET-4 (for comparison): PET having IV=0.83 produced in the presence of a Ge-containing catalyst (TR-8580H, supplied by Teijin Limited).

PET-5 (for comparison): PET having IV=0.84 produced in the presence of a Sb-containing catalyst (AA08E, supplied by Nan Ya Plastics Corporation).

PET-6 (for comparison): PET having IV=0.84 produced in the presence of a Ti—Mg-containing catalyst (7802, supplied by Nan Ya Plastics Corporation).

PET-7: Polyethylene terephthalate resin polymerized in the presence of an excess amount of a titanium-containing catalyst obtained by reacting titanium tetrabutoxide and monolauryl phosphate (IV=0.83, remaining Ti amount 120 ppm).

(Component C)

ABS-1: ABS resin (UT-61 (trade name), supplied by NIPPON A & L INC., free AS polymer component approximately 80% by weight and ABS polymer component (gel content insoluble in acetone) approximately 20% by weight, butadiene rubber component approximately 14% by weight, a weight average rubber particle diameter 0.56 μm, produced by bulk polymerization).

ABS-2: ABS resin (CHT (trade name), supplied by CHEIL INDUSTRY INC., content of rubber component comprising polybutadiene approximately 58% by weight, weight average rubber particle diameter 0.31 μm, produced by emulsion polymerization).

MBS-1: Styrene-containing rubbery polymer (PARALID EXL-2678 (trade name) supplied by ROHM AND HAAS Company, graft copolymer formed of 60% by weight of a core of polybutadiene and 40% by weight of a shell of styrene and methyl methacrylate, weight average particle diameter 0.35 μm, produced by emulsion polymerization).

MBS-2: Styrene-free rubbery polymer (PARALID EXL-2602 (trade name) supplied by ROHM AND HAAS Company, graft copolymer formed of 80% by weight of a core of polybutadiene and a shell of methyl methacrylate and ethyl acrylate, weight average particle diameter 0.23 μm).

Si: Composite-rubber-containing graft copolymer obtained by graft-polymerizing 90% by weight of a composite rubber having a structure in which a polyorganosiloxane rubber component and a polyalkyl(meth)acrylate rubber component are entangled each other so as not to separate, and methyl methacrylate (METABLEN S-2001 (trade name), supplied by Mitsubishi Rayon Co. Ltd.).

(Other Components)

P-1: Trimethyl phosphate

P-2: Bis(2,4-di-tert-butylphenyl)pentaerythritol diphosphite

TABLE 1

| | | | | Ex. 1 | Ex. 2 | Ex. 3 | Ex. 4 | Ex. 5 | Ex. 6 | Ex. 7 |
|---|---|---|---|---|---|---|---|---|---|---|
| Composition to be evaluated | PC | PC-1 | — | | | | | | 50 | |
| | | PC-2 | — | 95 | 90 | 70 | 50 | 50 | | 70 |
| | PET | PET-1 | — | 5 | 10 | 30 | 50 | 50 | | |
| | | PET-2 | — | | | | | | 50 | 30 |
| | Total | | Part by weight | 100 | 100 | 100 | 100 | 100 | 100 | 100 |
| | Stabilizer | P-1 | — | | | | | 0.05 | 0.05 | 0.05 |
| | | P-2 | — | | | | | 0.2 | 0.2 | 0.2 |
| Evaluation results | Remaining Ti amount | | ppm | 3 | 7 | 20 | 31 | 33 | 16 | 12 |
| | Charpy mechanical strength (notched) | | $kJ/m^2$ | 20 | 12 | 10 | 7 | 8 | 7 | 9 |
| | MVR (280° C., 2.16 kg) | Molded article | $cm^3/10$ min. | 10 | 13 | 19 | 35 | 34 | 63 | 27 |
| | | After moist heat treatment | | 15 | 23 | 46 | 93 | 97 | 186 | 71 |
| | | Change ratio | % | 150 | 177 | 242 | 266 | 285 | 295 | 263 |
| | Thermal stability | Failure in appearance | — | ○ | ○ | ○ | ○ | ○ | ○ | ○ |

Ex.: Example

TABLE 2

| | | | | C. Ex. 1 | C. Ex. 2 | C. Ex. 3 | C. Ex. 4 | C. Ex. 5 | C. Ex. 6 | C. Ex. 7 | C. Ex. 8 |
|---|---|---|---|---|---|---|---|---|---|---|---|
| Composition to be evaluated | PC | PC-2 | — | 40 | 50 | 50 | 70 | 90 | 70 | 70 | 70 |
| | PET | PET-1 | — | 60 | | | | | | | |
| | | PET-3 | — | | 50 | 50 | 30 | 10 | | | |
| | | PET-4 | — | | | | | | 30 | | |
| | | PET-5 | — | | | | | | | 30 | |
| | | PET-6 | — | | | | | | | | 30 |
| | Stabilizer | P-1 | — | | | 0.05 | 0.05 | | 0.05 | 0.05 | 0.05 |
| | | P-2 | — | | | 0.2 | 0.2 | | 0.2 | 0.2 | 0.2 |
| Evaluation results | Remaining Ti amount | | ppm | 37 | 34 | 31 | 18 | 5 | — | — | 56 |
| | Charpy mechanical strength (notched) | | $kJ/m^2$ | 6 | 6 | 6 | 8 | 10 | 9 | 9 | 9 |
| | MVR (280° C., 2.16 kg) | Molded article | $cm^3/10$ min. | 41 | 37 | 35 | 21 | 15 | 21 | 20 | 20 |
| | | After moist heat treatment | | 147 | 170 | 138 | 72 | 46 | 91 | 113 | 81 |
| | | Change ratio | % | 359 | 459 | 394 | 343 | 307 | 433 | 565 | 405 |
| | Thermal stability | Failure in appearance | — | Δ | Δ | ○ | ○ | ○ | ○ | x | ○ |

C. Ex.: Comparative Example

TABLE 3

| | | | | Ex. 8 | Ex. 9 | Ex. 10 | Ex. 11 | Ex. 12 | Ex. 13 |
|---|---|---|---|---|---|---|---|---|---|
| Composition to be | Component B | PET-1 | — | | 5 | 40 | 50 | | 30 |
| | | PET-2 | — | | | | | 50 | 30 |

TABLE 3-continued

|  |  |  |  |  |  |  |  |  |  |
|---|---|---|---|---|---|---|---|---|---|---|
| evaluated |  | PET-7 | — |  |  |  |  |  |  |
|  | Component | PC-1 | — |  |  |  | 50 |  |  |
|  | A | PC-2 | — | 95 | 60 | 50 |  | 70 | 70 |
|  | Total |  | Part by weight | 100 | 100 | 100 | 100 | 100 | 100 |
|  | Component | ABS-1 | — |  |  |  |  |  |  |
|  | C | ABS-2 | — |  | 5 |  |  |  |  |
|  |  | MBS-1 | — |  |  | 10 | 3 | 5 |  |
|  |  | MBS-2 | — | 5 |  |  |  |  |  |
|  |  | Si |  |  |  |  |  |  | 5 |
|  | Other | P-1 | — |  |  | 0.05 | 0.05 | 0.05 | 0.05 |
|  | components | P-2 | — |  |  | 0.2 | 0.2 | 0.2 | 0.2 |
| Evaluation | Remaining Ti amount |  | ppm | 4 | 25 | 30 | 17 | 13 | 19 |
| results | Charpy mechanical strength (notched) |  | kJ/m² | 72 | 62 | 50 | 31 | 58 | 66 |
|  | Heat resistance |  | °C. | 120 | 97 | 92 | 93 | 108 | 107 |
|  | MVR (280° C., 2.16 kg) | Molded article | cm³/10 min. | 10 | 26 | 34 | 63 | 31 | 21 |
|  |  | After moist heat treatment |  | 15 | 61 | 88 | 181 | 83 | 49 |
|  |  | Change ratio | % | 150 | 246 | 259 | 287 | 267 | 233 |
|  | Failure in appearance |  | — |  | ○ | ○ | ○ | ○ | ○ |
|  | Chemical resistance |  | — |  | ○ | ○ | ○ | ○ | ○ |

|  |  |  |  | Ex. 14 | Ex. 15 | Ex. 16 | Ex. 17 | Ex. 18 |
|---|---|---|---|---|---|---|---|---|
| Composition | Component | PET-1 | — | 30 | 30 | 30 | 30 |  |
| to be | B | PET-2 |  |  |  |  |  |  |
| evaluated |  | PET-7 |  |  |  |  |  | 30 |
|  | Component | PC-1 | — |  |  |  |  |  |
|  | A | PC-2 | — | 70 | 70 | 70 | 70 | 70 |
|  | Total |  | Part by weight | 100 | 100 | 100 | 100 | 100 |
|  | Component | ABS-1 | — |  | 20 | 45 | 10 | 10 |
|  | C | ABS-2 | — |  |  |  |  |  |
|  |  | MBS-1 | — | 1 |  |  | 3 | 3 |
|  |  | MBS-2 | — |  | 3 | 3 |  |  |
|  |  | Si |  |  |  |  |  |  |
|  | Other | P-1 | — | 0.05 | 0.05 | 0.05 | 0.05 | 0.05 |
|  | components | P-2 | — | 0.02 | 0.2 | 0.2 | 0.2 | 0.2 |
| Evaluation | Remaining Ti amount |  | ppm | 21 | 18 | 19 | 18 | 52 |
| results | Charpy mechanical strength (notched) |  | kJ/m² | 20 | 50 | 43 | 54 | 41 |
|  | Heat resistance |  | °C. | 110 | 99 | 91 | 102 | 95 |
|  | MVR (280° C., 2.16 kg) | Molded article | cm³/10 min. | 18 | 20 | 38 | 22 | 29 |
|  |  | After moist heat treatment |  | 41 | 51 | 109 | 52 | 94 |
|  |  | Change ratio | % | 228 | 255 | 287 | 236 | 324 |
|  | Failure in appearance |  | — | ○ | ○ | ○ | ○ | Δ |
|  | Chemical resistance |  | — | ○ | ○ | ○ | ○ | ○ |

Ex.: Example

TABLE 4

|  |  |  |  | C. Ex. 9 | C. Ex. 10 | C. Ex. 11 | C. Ex. 12 |
|---|---|---|---|---|---|---|---|
| Composition | Component | PET-1 | — | 60 |  |  | 0.5 |
| to be | B | PET-3 |  |  | 30 | 50 |  |
| evaluated |  | PET-7 | — |  |  |  |  |
|  | Component | PC-2 | — | 40 | 70 | 50 | 99.5 |
|  | A |  |  |  |  |  |  |
|  | Total |  | Part by weight | 100 | 100 | 100 | 100 |

TABLE 4-continued

|  |  |  | | C. Ex. 9 | C. Ex. 10 | C. Ex. 11 | C. Ex. 12 |
|---|---|---|---|---|---|---|---|
|  | Component | ABS-1 | | | | | 10 |
|  | C | ABS-2 | — | 5 | 5 | 10 | 3 |
|  | Other | P-1 | — | 0.05 | 0.05 | 0.05 | 0.05 |
|  | components | P-2 | — | 0.2 | 0.2 | 0.2 | 0.2 |
| Evaluation results | Remaining Ti amount | | ppm | 37 | 22 | 46 | 2 |
|  | Charpy mechanical strength (notched) | | kJ/m² | 29 | 58 | 45 | 73 |
|  | Heat resistance | | ° C. | 89 | 105 | 87 | 125 |
|  | MVR (280° C., 2.16 kg) | Molded article | cm³/10 min. | 40 | 20 | 37 | 9 |
|  |  | After moist heat treatment | | 148 | 80 | 170 | 13 |
|  |  | Change ratio | % | 370 | 400 | 459 | 133 |
|  | Failure in appearance | | — | x | x | x | ○ |
|  | Chemical resistance | | — | ○ | ○ | ○ | x |

Ex.: Example

EFFECT OF THE INVENTION

The resin composition of this invention is excellent in mechanical strength, chemical resistance and thermal stability and further has excellent moist heat resistance.

INDUSTRIAL APPLICABILITY

The resin composition of this invention can be widely used in the fields of architectural structures, construction materials, agricultural materials, marine materials, vehicles, electric and electronic machines and equipment, machines and others.

The invention claimed is:

1. A resin composition comprising 50 to 99 parts by weight of an aromatic polycarbonate resin (component A) and 1 to 50 parts by weight of a polyester resin (component B), the component B being a polyester resin polymerized in the presence of a titanium-phosphorus catalyst obtained by a reaction between a titanium compound (I) represented by the following formula (I) or a titanium compound obtained by reacting said titanium compound (I) with an aromatic polyhydric carboxylic acid represented by the following formula (II) or an anhydride thereof and a phosphorus compound represented by the following formula (III),

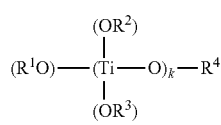
(I)

wherein each of $R^1$, $R^2$, $R^3$ and $R^4$ is independently an alkyl group having 2 to 10 carbon atoms, k is an integer of 1 to 3, and when k is 2 or 3, each of two or three $R^2$s and $R^3$s may be the same as, or different from, each other or every other,

(II)

wherein m is an integer of 2 to 4,

(III)

wherein $R^5$ is a substituted or non-substituted aryl group having 6 to 20 carbon atoms or an alkyl group having 1 to 20 carbon atoms.

2. The resin composition of claim 1, which contains 0.001 to 50 ppm of a titanium element.

3. The resin composition of claim 1, wherein the titanium-phosphorus catalyst is represented by the following formula (IV),

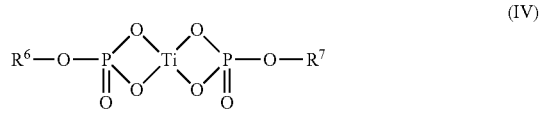
(IV)

wherein each of $R^6$ and $R^7$ is independently an alkyl group having 2 to 12 carbon atoms or an aryl group having 6 to 12 carbon atoms.

4. The resin composition of claim 1, wherein the component B is polyethylene terephthalate.

5. The resin composition of claim 1, which contains 1 to 50 parts by weight of a rubbery polymer (component C) per 100 parts by weight of total of the components A and B.

6. The resin composition of claim 5, wherein the component C is a rubbery polymer obtained by copolymerizing an acrylic monomer or a mixture of an acrylic monomer with a monomer copolymerizable with the acrylic monomer in the presence of at least one rubber component selected from the group consisting of a diene-based rubber, an acrylic rubber and a silicone-based rubber.

7. An injection-molded article formed from the resin composition of claim 1.

8. The injection-molded article of claim 7, which is an interior or exterior automotive trim part.

9. The injection-molded article of claim 7, which is a housing material for an OA machine or electric or electronic machine.

* * * * *